United States Patent
Taylor et al.

(10) Patent No.: US 11,567,919 B2
(45) Date of Patent: *Jan. 31, 2023

(54) METHODS AND SYSTEMS FOR PERFORMING TRANSPARENT OBJECT MIGRATION ACROSS STORAGE TIERS

(71) Applicant: salesforce.com, inc., San Francisco, CA (US)

(72) Inventors: James Taylor, San Francisco, CA (US); Bill C. Eidson, Palo Alto, CA (US); Kevin Oliver, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,614

(22) Filed: May 26, 2021

(65) Prior Publication Data

US 2021/0279221 A1    Sep. 9, 2021

Related U.S. Application Data

(63) Continuation of application No. 15/727,299, filed on Oct. 6, 2017, now Pat. No. 11,036,706, which is a continuation of application No. 13/089,928, filed on Apr. 19, 2011, now Pat. No. 9,824,108.

(60) Provisional application No. 61/325,499, filed on Apr. 19, 2010.

(51) Int. Cl.
*G06F 16/22* (2019.01)

(52) U.S. Cl.
CPC ............................... *G06F 16/2272* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

Final Office Action for U.S. Appl. No. 13/089,928 dated Apr. 2, 2015, 30 pages.

(Continued)

*Primary Examiner* — Kris E Mackes
*Assistant Examiner* — Soheila (Gina) Davanlou
(74) *Attorney, Agent, or Firm* — Kwan & Olynick LLP

(57) ABSTRACT

In accordance with embodiments, there are provided mechanisms and methods for performing transparent object migration across storage tiers. In an embodiment and by way of example, a method for appending data to large data volumes is provided. The method embodiment includes a) setting a CustomEntityOption bit that determines (at object creation time) where the object is stored, either in the relational or the non-relational data store portion, b) loading the CustomEntityOption bit in a cached CustomEntityDefinition, c) showing the CustomEntityOption bit as EntityInfo, and d) allowing custom object definition and Metadata API functionality when the bit is shown.

21 Claims, 15 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,223,171 B1 | 4/2001 | Chaudhuri et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Mans |
| 6,405,220 B1 | 6/2002 | Brodersen et al. |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,359,316 B2 | 1/2013 | Franke et al. |
| 8,386,446 B1 | 2/2013 | Pasupathy et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029207 A1 | 3/2002 | Bakalash et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050083 A1 | 3/2005 | Jin et al. |
| 2005/0050555 A1 | 3/2005 | Exley et al. |
| 2005/0055384 A1 | 3/2005 | Ganesh et al. |
| 2005/0091098 A1 | 4/2005 | Brodersen et al. |
| 2007/0073828 A1 | 3/2007 | Rao et al. |
| 2008/0114725 A1 | 5/2008 | Indeck et al. |
| 2009/0177744 A1 | 7/2009 | Marlow et al. |
| 2009/0210429 A1 | 8/2009 | Agrawal et al. |
| 2009/0254514 A1 | 10/2009 | Adair et al. |
| 2010/0063878 A1 | 3/2010 | Bachet et al. |
| 2010/0161593 A1 | 6/2010 | Paulsen et al. |
| 2010/0205160 A1 | 8/2010 | Kumar et al. |

OTHER PUBLICATIONS

Final Office Action for U.S. Appl. No. 13/089,928 dated Oct. 3, 2013, 26 pages.

Final Office Action for U.S. Appl. No. 13/089,928 dated Sep. 13, 2016, 33 pages.

Fred Swartz (Apr. 14, 2004, http://www.fredosaurus.com/notes-db/example-bookbiz/slides/6select-groupby.html), 6 pages.

Non-Final Office Action for U.S. Appl. No. 13/089,928 dated Aug. 14, 2014, 29 pages.

Non-Final Office Action for U.S. Appl. No. 13/089,928 dated Feb. 25, 2016, 28 pages.

Non-Final Office Action for U.S. Appl. No. 13/089,928 dated Mar. 1, 2013, 20 pages.

Non-Final Office Action for U.S. Appl. No. 15/727,299 dated Feb. 20, 2020, 19 pages.

Notice of Allowance for U.S. Appl. No. 13/089,928 dated Apr. 28, 2017, 7 pages.

Notice of Allowance for U.S. Appl. No. 15/727,299 dated Apr. 28, 2021, 10 pages.

Notice of Allowance for U.S. Appl. No. 15/727,299 dated Dec. 9, 2020, 11 pages.

Restriction Requirement for U.S. Appl. No. 13/089,928 dated Oct. 2, 2012, 8 pages.

Supplemental Notice of Allowability for U.S. Appl. No. 13/089,928 dated Oct. 25, 2017, 2 pages.

*FIG. 14*

| |
|---|
| 1401, INDEX NUMBER |
| 1403, FIELDENUMORID |
| 1405, FIELD2ENUMORID |
| 1407, ISACTIVE |
| 1409, ORGANIZATION ID. |
| 1411, A SUBSET OF NON INDEXED COLUMN NAMES AS A COVERED COLUMNS |

METHODS AND SYSTEMS FOR PERFORMING TRANSPARENT OBJECT MIGRATION ACROSS STORAGE TIERS

CLAIM OF PRIORITY

This application is a continuation of, and claims the benefit of, U.S. application Ser. No. 15/727,299, filed Oct. 6, 2017, entitled "Methods and Systems for Performing Transparent Object Migration Across Storage Tiers", which is a continuation of U.S. application Ser. No. 13/089,928, filed Apr. 19, 2011, entitled "Methods and Systems for Performing Transparent Object Migration Across Storage Tiers", now U.S. Pat. No. 9,824,108 with an issue date of Nov. 21, 2017, which claims the benefit of and priority to U.S. Provisional Patent Application No. 61/325,499, entitled "Methods and Systems for Performing Transparent Object Migration Across Storage Tiers", filed Apr. 19, 2010, the entire contents of which are all incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates to storing data and, in particular, to organizing data for multiple disparate storage tiers to facilitate transparent migration.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system relies on the data in the database system complying with certain constraints. However, this limits the types, sizes, and kinds of data that can be stored in the database.

In order to provide for more types, kinds, and sizes of data, the database can be supplemented with an additional data store to hold other data and additional data. The data can be searchable separately or pointers to the separate data store in the database can be searchable. However, the separate data store adds complexity to modifying, correcting, and updating the database and the data store. This added complexity may interfere with users accessing the database and finding data in the separate data store.

Accordingly, it is desirable to provide techniques to improve performance, security, efficiency, and/or ease of use of the database systems.

BRIEF SUMMARY

In accordance with embodiments, there are provided mechanisms and methods for appending data to large data volumes in a multi-tenant store. These mechanisms and methods for appending data to large data volumes can enable embodiments to provide more reliable and faster maintenance of changing data.

In an embodiment and by way of example, a method for appending data to large data volumes is provided. The method embodiment includes receiving new data for a database. The new data is written to a temporary log. The size of the log is compared to a threshold. Then the log is written to a data store, if the size of the log is greater than the threshold.

While one or more implementations and techniques are described with reference to an embodiment in which Methods and Systems for Appending Data to Large Data Volumes in a Multi-Tenant Store is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

Additionally FIG. 14 is a block diagram illustrating an index metadata structure for a combined data repository in an embodiment.

DETAILED DESCRIPTION

General Overview

Systems and methods are provided for performing transparent object migration across storage tiers. These systems and methods are particularly valuable in the context of a multi-tenant database.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for performing transparent object migration across storage tiers will be described with reference to example embodiments. In one example implementation, the operation of an API (Application Programming Interface) is controlled in a combined data repository having a relational data store portion and a non-relational data store portion. A CustomEntityOption bit is set that determines (at object creation time) where the object is stored, either in the relational or the non-relational data store portion. The CustomEntityOption bit is loaded in a cached CustomEntityDefinition. The CustomEntityOption bit as is shown as EntityInfo, and custom object definition and Metadata API functionality is allowed when the bit is shown.

The database table or tables are subject to queries and other application operations through application servers that may use APIs. The queries may be in any of a variety of different forms, such as OQL (Object Query Language), SQL (Structured Query Language) queries, individual get-by-id requests, or any other type of query, for example. When queries come to the database server, they need to be performed against both the database server AppendLog and the data store segments. In order for the database to respond to the query, the database servers need an up-to-date copy of the entire AppendLog and the data store segment metadata. Accordingly, the application server, when submitting a query request, can, as part of the request, ensure that the database server has an up-to-date copy of the AppendLog data and the data store segment metadata (cached) prior to forwarding the request to the database server.

Structural Environment

Figure 1:
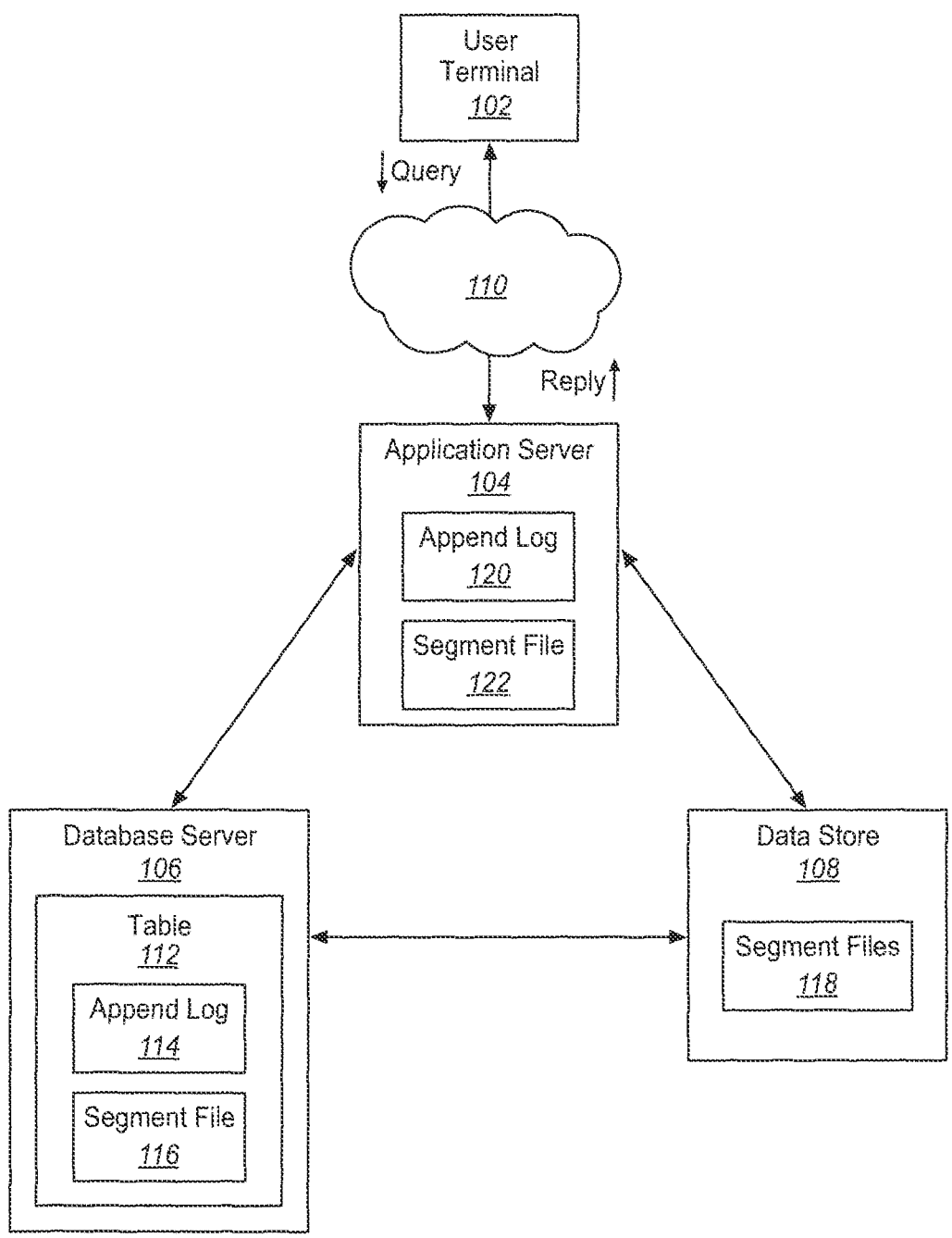
FIG. 1 illustrates a block diagram of a database server structure with appended data in a large data store in an embodiment.

FIG. 1 shows a block diagram of a database server structure to aid in understanding the description below. In FIG. 1, a user, client, or customer, through a user terminal 102 sends a request to an application server 104. The user terminal may be directly connected or remotely connected to the application server. The user terminal may be connected though a wide area network, such as the Internet 110, or through a local or private network. The user request may be to view or receive data or information or to modify or add to data or information that is already stored.

The application server 104 is coupled to a database server 106 which serves or receives the information of the request to or from the application server. The database server includes a table 112 in which the data is stored. This data may contain an append log 114 and a segment file 116. The append log contains some number of smaller files and additional files are appended to it as changes are made to the content of the database. As described below, the append log is eventually consolidated into a single file that is stored and a new append log can be started in its place. The segment file contains metadata about files that are stored in another location. The metadata can include file names, ordering, location, and contents information. Alternatively, the append log and segment file may be stored in another location. The table may be in the form of a conventional relational database or in any other form.

The application server is also coupled to a data store 108, as described above. The data store stores segment files 118 and may also store a variety of other files, depending on the particular use made of the data store. In the described examples, a query or other request from the application server is provided only to the database server. In one example, the files of the data store are not searched. Instead, the table includes searchable pointers or indices to the data in the data store. This allows requests to be serviced more quickly. However, for particular requests, or for particular implementations, the data store may contain the pointers or indices or may be searched directly. As shown, the data store includes stored segment files 118 which may be organized using its file system.

The application server 104 also include an append log 120 and a segment file 122. These allow the application server to track changes and progress to both the append log and the segment file in order to manage the collection, updating, and storing of such data. These may both be saved by the database server, instead, depending upon the application. There may be and typically will be multiple user terminals, application servers, database servers, and data stores. The diagram of FIG. 1 shows only one of each in order to simplify the drawing and the understanding of the operations described below.

In one example, the database servers are stateless. They locally cache immutable files and have an in-memory cache of immutable data structures. However, they do not have any "on startup" bootstrapping or any cross-server synchronization of changes, etc. By providing an in-memory cache, the entire database server state (in the database) does not need to be re-created for every request. The in-memory cache allows the tables and other data to be synchronized without any startup process. As described below, incremental changes are handled, while the servers are kept stateless, and the data store file metadata is stored in the database.

Query Handling

Figure 2:
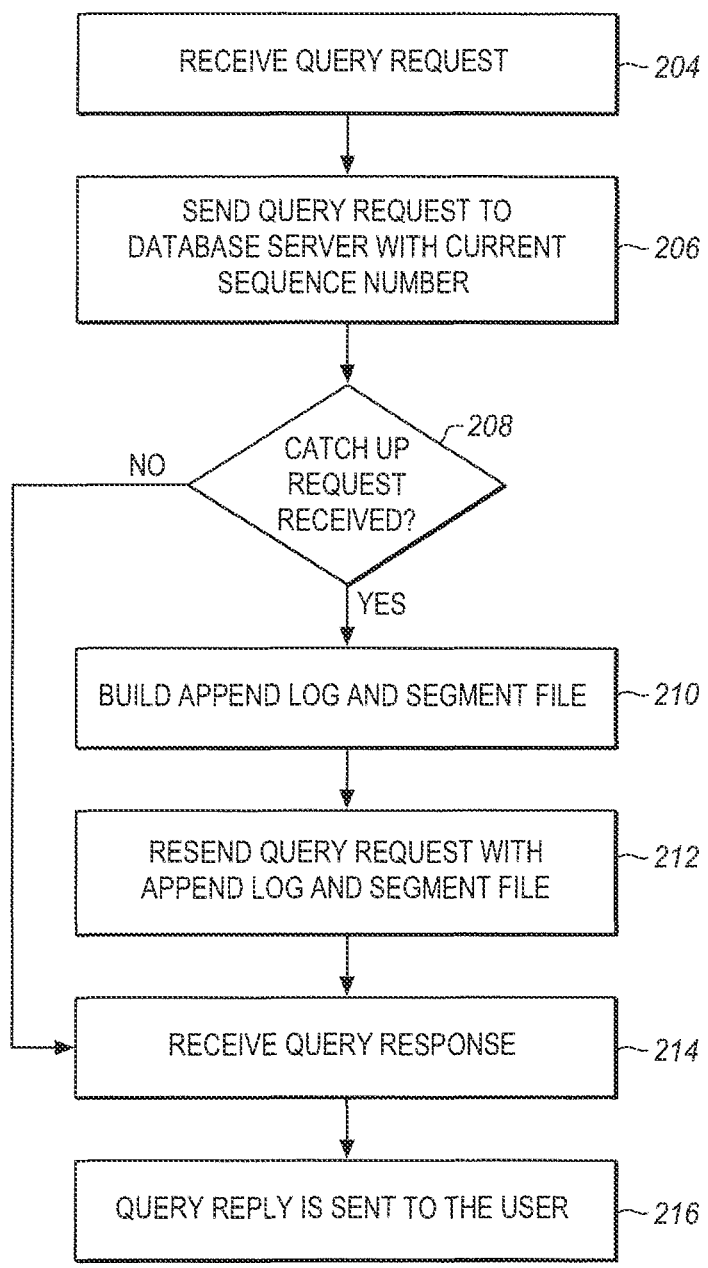
FIG. 2 is an operational flow diagram illustrating serving a query at a user terminal in an embodiment.

FIG. 2 shows an example process for serving a query or other data modification to a database server in the context of the append log and segment file. FIG. 2 is from the perspective of the application server, while FIG. 3 shows the same process from the perspective of the database server.

In FIG. 2, a process begins, at block 204, when the application server receives a request from a user. Alternatively, the request could come from a maintenance application or a developer. The request may be to delete an entry in the database, add an entry, modify an entry or perform a much more complex operation. In one example, the data store is also used to hold large files, such as media, graphic, and high resolution files that are not well-suited to the database. Accordingly, the request may be to add a reference, index, pointer or metadata into the database to allow such a file in the data store to be searched and found from the database.

At block 206, the application server, having received the request, sends it to a database server that can access the database to service the request. The request can contain a current sequence number, so that the database server can ensure that it is working with current data. In this example, the application server accesses a table which provides the most current sequence number for the append log and the segment file. By checking a single authoritative version of the append log and segment file sequence number reference, a single application server can send requests to many different database servers. The database servers are not required to maintain any synchronization.

Figure 3:
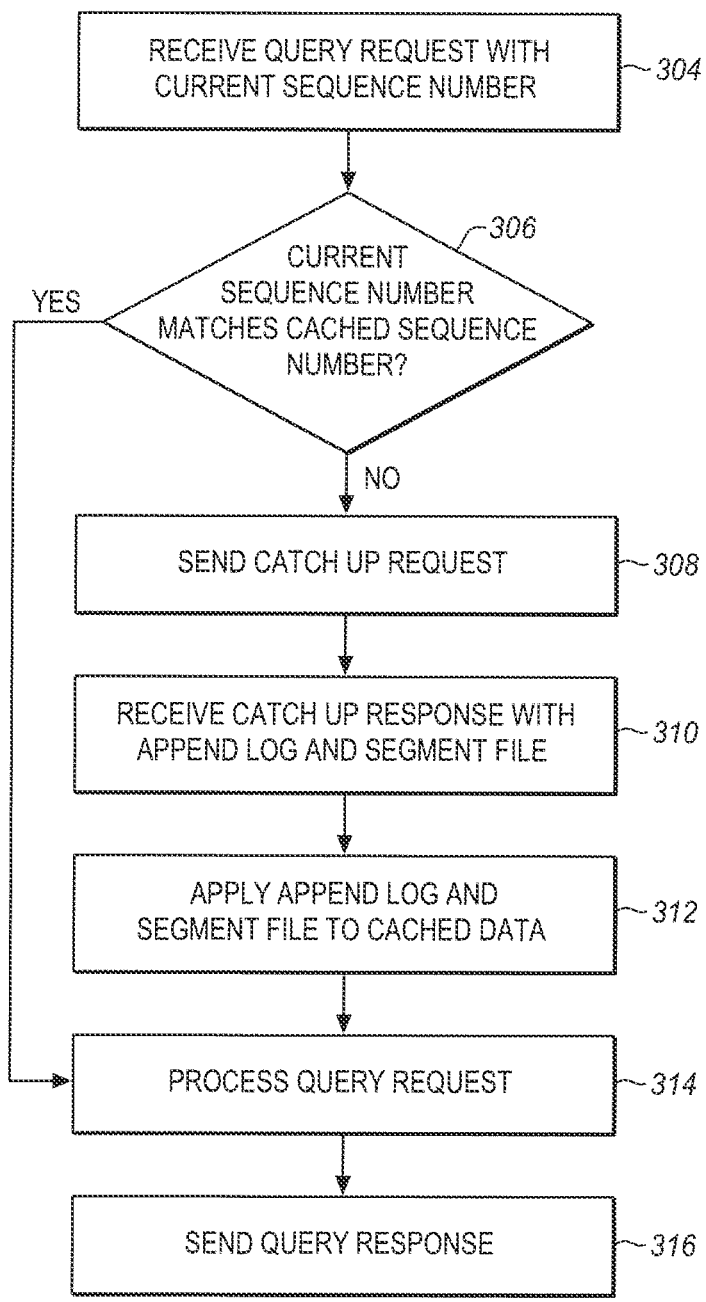
FIG. 3 is an operational flow diagram illustrating serving a query at a database server in an embodiment.

Referring to FIG. 3, the database server at block 304 receives the query request from the application server as mentioned above. The database server then compares the received sequence number for its cached version of the append log and segment file to the received sequence number at block 306. If they match, then the database server processes the request at block 314. The request can be safely processed against the database and also the append log, since the append log will be in its most current form.

On the other hand, if the sequence numbers do not match, then the database server can request that it be sent the latest updates at block 308. The application server at block 206 listens for a catch up request at block 208. If one is received, then at block 210, the application server builds an append log and segment file to send to the database server. This may then be sent together with the query request at block 212. The response to the catch up request can be a complete replacement of the prior append log and segment file, or to reduce the amount of transmitted data between the two servers, the response can contain only the data added since the database server's version was last updated. The database server, for example, can send its most recent sequence number together with its catch up request. By comparing the database server's most recent number to the absolute most recent version, the application server can determine the differences and send only the differences.

In this example, the application server does not send the append log and segment files or their updates with the original request. This is done to reduce the amount of data sent with a request. However, as an alternative, both files may be maintained in a single version and sent to the respective database server in the latest version with each request. The size of these files can be kept small through frequent updates of the data store or by generating many files. Each tenant, organization, customer etc. may have several different files for different portions of the database fields.

In one example, both the application server and the database server maintain relational database tables and the append logs and segment files are stored in these tables. The append logs and segment files may be stored in any of a variety of different locations in the database that provide sufficient space for the data. In an Oracle Corporation database a BLOB (Binary Large Object) may be used. The BLOB allows several gigabytes of unstructured storage. In the present example, the data may be structured but it need not be structured in a way that is consistent with the rest of the database.

At block 310, the database server receives the response to the catch up request including a partial or complete append log and segment file. After applying the updates at block 312, by updating or replacing, the database server can then process the request at block 314. At block 316, the results are sent back to the application server. At block 214, the application server receives the results and can then service the user at block 216, with a confirmation, report, or reply, depending on the nature of the request.

In one example, the database is divided into groups, organizations, etc. so that, while there may be many append logs and segment files, each one is not very large. This is one reason why any one database server may not be up to date for any one particular table.

As mentioned above, the sequence number (sequence_number) can be used to manage server state for each organization or database table. The sequence number can be used to represent the current state of any given database server organization or table. In one example, a table, such as Table 1, can be used to track the sequence number. The table may use standard 32-way organization partitioning and be an index organized table, however it may also take other forms. The PK (Primary Key) for the table may be selected as table_id, or any other suitable key.

TABLE 1

Core Sequence Number.

| Value | Type | Comments |
|---|---|---|
| organization_id | CHAR(16) | ID for organization |
| table_id | CHAR(16) | ID for table within organization |
| sequence_number | NUMBER | Current database server sequence number |

As indicated in Table 1, the organization identification and the table enumerator are represented as 15 character values, while the sequence number is a number. Any desired string of characters, letter, or number may be used, depending on the application. In the described examples it is either 0 or 1, however a greater range of numbers may be used, depending on the application.

In order to synchronize different databases to the same information, the sequence, number as described above, can be used in all of the different databases in which it occurs. In such an example, the sequence number in any newly visible rows can be checked against an outside source, such as the application server, to ensure that it is greater than all previously visible sequence numbers for that particular organization and table. Based on this check, the integrity of the data can be maintained without an autonomous updating transaction. Instead, the row for this table can be locked and incremented as part of the transaction.

As described, requests to database servers may contain header information in order to convey the current database server state (core sequence_num, core_append_log, core_segment_file) for the relevant organization, table ids involved in the operation. (For example, a 'get' operation would only need the table being 'got', but an OQL request would need an entry for each involved table_id).

In one example, each request from the application server to the database server contains for-each table_id in any one organization, a header structure containing:
current_sequence_number (from core_sequence_number); and an optional 'catch up' block. The catch up block contains: catchup_from_core_sequence_number; the data from core_segment_file from catchup_sequence_number to current_sequence_number; the data from core_append_log from catchup_sequence_number to current_sequence_number; and any of the schemas from the core_append_log schema that are required.

When a database server receives a request, the database server actions can be represented in pseudocode as follows:
  Examines its in-memory cache to see what the current sequence_number is for the given (organization_id, table_id). (If there's no entry in the cache, then its current_sequence_number can be set to 0).
  If the request's current_sequence_number=cached current_sequence_number then process the request.
  If the request's current_sequence_number>cached current_sequence_number
  If the optional catchup from block is specified and if its catchup_from_sequence_number<=the cached current_sequence_number, then
    Update the local cache with all the changes in the catchup block
    Process the request
    Otherwise (if there is no catchup block or its catchup_from_sequence_number>current_sequence_number) then send back a DATABASE_SERVER_CATCHUP_REQUIRED specifying the cache current_sequence_number.
  Otherwise, if the request's current_sequence_number<cached current_sequence_number
  (This is a race-condition state, meaning some other app-server has 'pushed' the server state ahead)
    If the request's current_sequence_number is still cached (not too old), then process the request with the state as of that sequence number.
    Otherwise, send back a DATABASE SERVER CATCHUP REQUIRED specifying the cache current_sequence_number The application server acting upon a client request, performs the actions described in pseudocode below:
  Upon receiving DATABASE_SERVER_SEQUENCE_AHEAD, retry after re-fetching the sequence_number.
  Upon receiving DATABASE_SERVER_CATCHUP_REQUIRED, retry the request, but include the 'catchup' block built from the sequence_number specified in the DATABASE_SERVER_CATCHUP_REQUIRED failure.

With this protocol, the database server always has an up-to-date copy (cached) of the core_append_log and the core_segment_files prior to executing any request; it is logically equivalent to transferring the entire state with every request, but, for efficiency purposes, the server cache ensures that, on-average, only the new append_log data is sent.

Append Log

In one embodiment, the append log may also be stored in a database table as shown by the example of Table 2.

TABLE 2

| Core Database Server Append Log | | |
|---|---|---|
| organization_id | CHAR(15) | The organization |
| table_id | CHAR(15) | The table |
| database server_append_log_id | CHAR(15) | PK |
| sequence_number | NUMBER | Relevant as-of-version |
| raw_data_blob | BLOB | Raw data for the row(s) |

The raw_data/raw_data_blob part of the table stores the actual data of the append log. Typically data is simply appended to this field as it is developed. The data may be stored in any of a variety of different ways. In one example, the data is stored as Avro serialized binary data. Avro is a data serialization system from the Apache Software Foundation Each time there is an insert, update, or delete, a row or set of rows is added to the field in a compressed form. For batch inserts or updates, an append_log row may be created for each insert with the raw_data/raw_data blob storing the set of data. While Avro serialization is described herein, any of a variety of other data storing techniques may be used instead or in addition.

Figure 4:
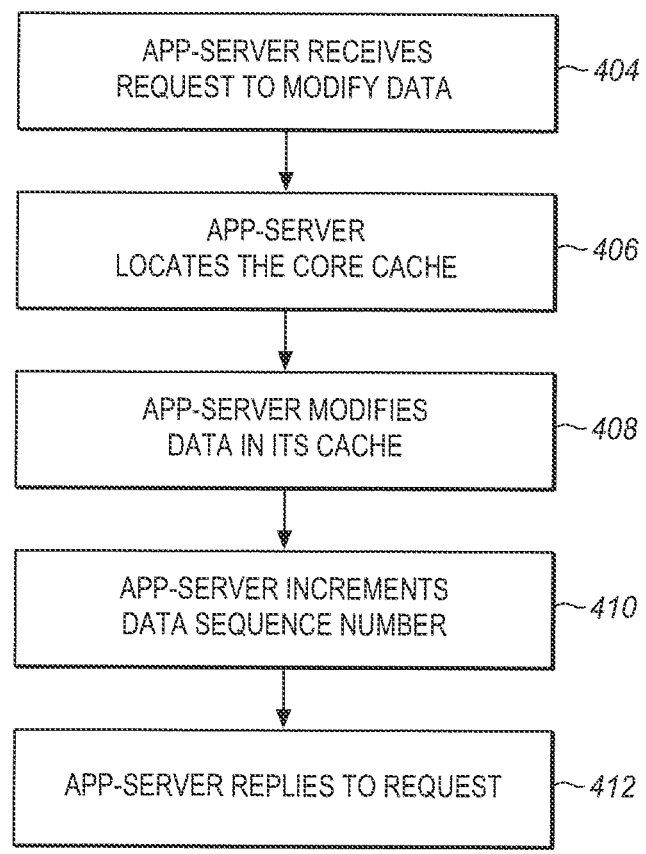
FIG. 4 is an operational flow diagram illustrating updating data in a database server structure in an embodiment.

FIG. 4 shows an example of using the segment file, append log and the tables above to update data in the system. The same or a similar process may be used for deletions, insertions, and other changes. At block 404, the application server receives a request to modify data. This can be an addition, deletion, or change. As mentioned above, this request may be in the form of OQL or any other suitable form, depending on the particular implementation and system needs.

At block 406, the application sever locates the cache with which it will service the request. This corresponds to the core segment file and the core append log. If there is only one application server, the core files may reside with the application server, but they may also reside in another location.

At block 408, the application server, upon receiving the request, modifies the data in the cache based on the request. This data will be in the append log. The application server, accordingly, also increments the data sequence number for the particular append log at block 410. If appropriate for the applicable protocols, the application server can then reply or confirm to the requestor that the request has been fulfilled at block 412.

As described in FIG. 4, the application server performs inserts, deletions, and modifications, without any communication with any database server. In such a configuration the changes are performed only on the core_append_log. The changes will be propagated to the database servers upon processing a new request as in FIGS. 2 and 3.

In another example, a database server may also receive an updated append log, or append log portion and sequence number for its append log, so that versions can be tracked between different database servers and between the database server and the application server.

In one example, all of the changes to the data are made by adding one or more additional rows to the append logs. These can be stored in a free form unstructured field of a database, such as a BLOB field, or in some other easily accessible location. The application servers maintain the current version of the append log and send updates to database servers when they are needed. The append log may be highly structured, but in the described examples, it is not.

To structure the data, periodically, the append log is processed to apply a usable structure. In one example, this happens when the append log becomes large enough to write to the data store. When the append log becomes large enough, the append log is rewritten and formatted to generate a new segment file. The segment file is then written to the data store. However, the segment file could be used by the application server without being written to the data store as new data accumulates further. Alternatively, the data could be processed to form a new formatted append log. Further data changes could then be added to the new append log until the time for generating a new segment file for the data store.

In the described examples, the append log provides a location to which new data may very quickly be added. As a result, queries are not slowed by waiting for new data to be combined or consolidated with older data. The system simply appends the new data to the log and moves on. Because data is added to the append log without any significant processing, there may be additions, deletions, and replacements of particular fields in the same log. In order to use the data to reply to a query, the entire append log can be read to determine the actual status of any particular data value. If, for example, an address is added, and then modified in the append log, then only a complete read of the log will provide the current value. When it comes time to process the append log, the replaced values can be deleted, so that only the last, most current values remain.

In an alternative configuration, the append log may be maintained as it is created. In that configuration, an address change would not simply be appended, but compared to any other previous entries, so that the earlier values can be changed. This requires more processing and analysis and may delay access to the data, however, it reduces the need to reformat the append log later.

Optimization

Figure 5:
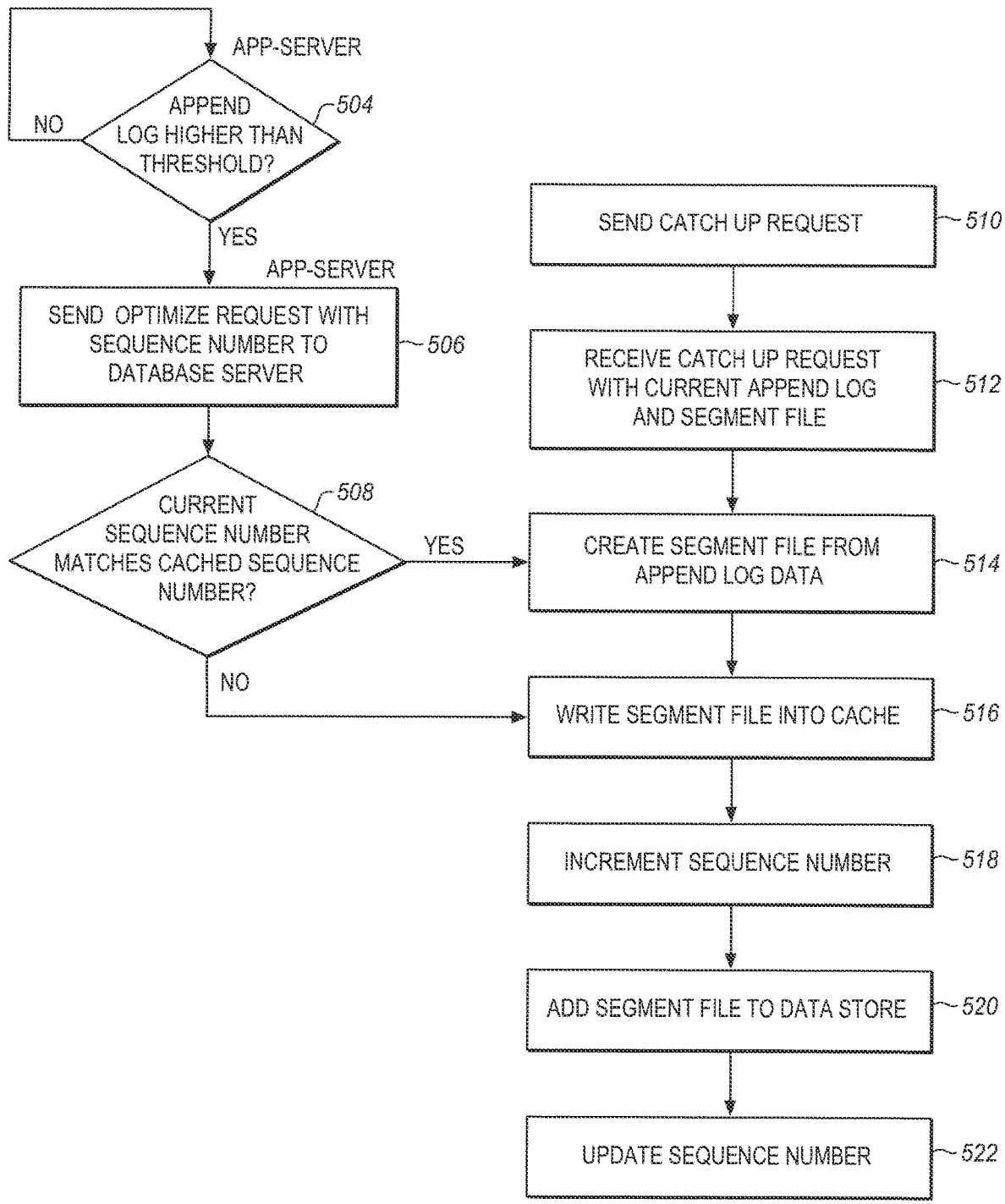
FIG. 5 is an operational flow diagram illustrating optimizing data in a database server structure in an embodiment.

FIG. 5 shows an example of periodically optimizing data from the append log so that a segment file may be written into the data store. At block 504, the application server analyzes the append log to determine its size. The size may be measured in bytes, lines, rows or any other measure. Alternatively, the application server, may analyze the time or number of writes that have been made to the append log. In this example, the application server analyzes the core append log, which is the append log that is the most current.

The determined size, time, or number is then compared to an appropriate threshold. If the threshold has been reached, then at block 506, the application server generates and sends an optimization request. Otherwise the application server will wait or count and repeat the analysis and threshold comparison. In one example, the threshold is selected as a desired size in bytes for writing a file to the data store. The data store may have a minimum file size by design, or the system may be configured to limit the file size of files in the data store in order to reduce the total number of files. Alternatively, a threshold may be used to limit the number or frequency of optimization routines.

The optimization request is sent to the unit that will perform the optimization. This may be any unit from, for example, FIG. 1, or it may be another component not shown in the figures. In one example, the database server performs the optimization due to its connections within the system and its processing capabilities.

The application server may include a sequence number for the most current append log and other information as shown in Tables 3 and 4 in its optimization request. The database server, upon receiving the optimization request from the application server can compare its sequence number for the append log to the received sequence number at block 508. If the database server does not have the current version of the append log, then at block 510 it sends a catch up request back to the application server. The catch up request is a request for the latest version with the sequence number that matches the sequence number received from the application server. The application server will respond to the request and at block 512, the database server receives the most current version of the append log.

Once the database server has the most recent version of the append log, it can then perform the optimization. The optimization is a process that converts the many entries appended together to form the append log into a single segment file with a structured format. To do so, the database server can read all of the entries in the log compare them and rewrite them as a single set of entries containing only the most current data in the log. The entries can also be organized and sorted for more efficient search, retrieval and modification later.

The optimization process at block 514 may be performed by reading all of the files at depth 0 and 1. This is typically all of the files in the append log. The application server can then rewrite all of the files as depth 0 files, delete the existing files, and then write the rewritten files into a new segment file. The new segment file can then be written into the main cache at block 516 to become the new core segment file. The sequence number for the new segment file can be incremented at block 518. The new segment file can also be written into the data store at block 520. The sequence number at the data store can also be incremented or updated to reflect the completion of the operation at block 522.

The segment file can be a file that is created and completed by a single optimization operation. At the next optimization operation, a new segment file is then created. Alternatively, the segment file can be updated with each optimization. The segment file can then be a set of rows, segments, or sub-files. Each change to the segment file can be accompanied by a change to a sequence number so that versions can be tracked as with the append log.

The optimization can be described in pseudo-code as follows:

The application server sends a request to a database server to start optimizing at depth=0.
The database server processes the request (reading all files at depth=0 and depth=1, and rewriting the combination as a new set of depth=0 files).
Once done, the application server deletes any existing core_segment_files for the organization/table_id and depth=0 or depth=1, then writes 1 row per newly created files into core_segment_file where
organization_id=<the org>
core_segment_file_id=<new id>
table_id=<the table>
data_store_file=<the file id>
depth=0—all the new files are at depth 0
sequence_number=<increment core_sequence_number for this organization_id/table_id>, same for all new rows.
starting_key=<the starting key for this file>
ending_key=<the starting key for this file>
After that, the core_segment_file, for this organization/table_id will contain the newly created files at depth 0, and no files at depth 1 (since those were optimized into depth 0).

The sequence number for each of the new rows will be the same number. The lock to increment the sequence number can be taken at the last possible instant before commit.

Figure 6:
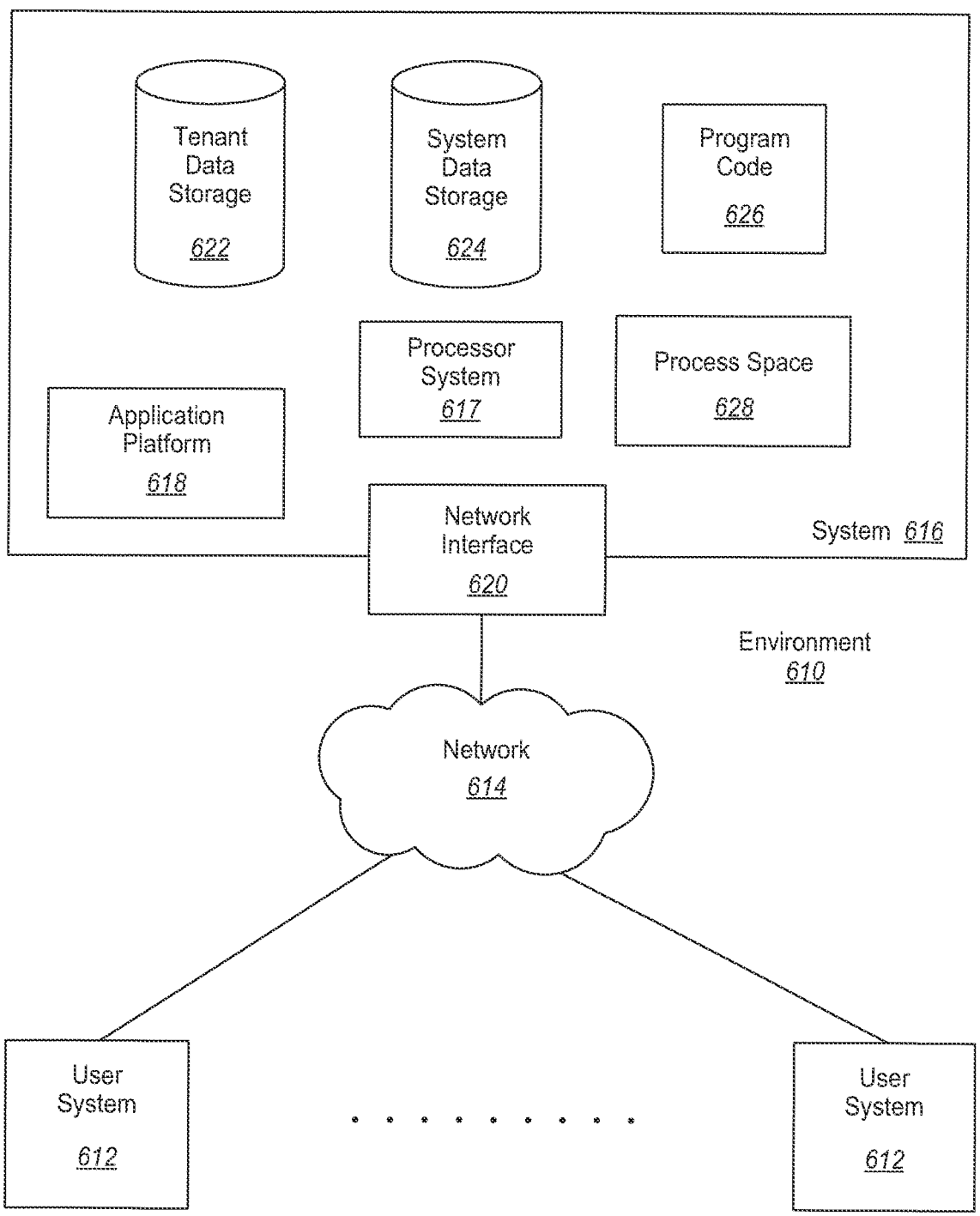
FIG. 6 illustrates a block diagram of an example of an environment wherein an on-demand database service might be used.
Figure 7:
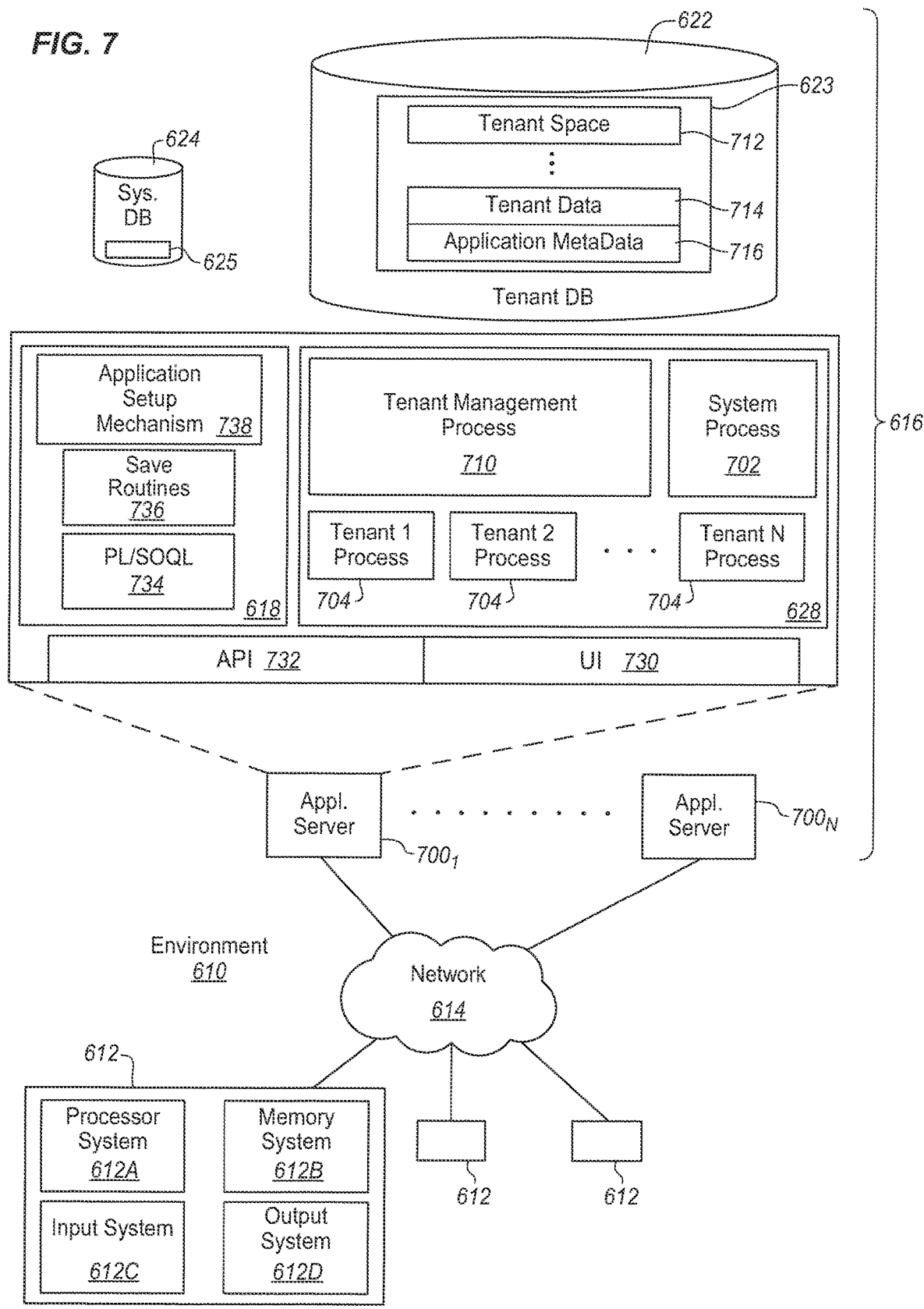
FIG. 7 illustrates a block diagram of an embodiment of elements of FIG. 5 and various possible interconnections between these elements.

The operations and structures described above may be implemented in a variety of different systems and environments. FIGS. 6 and 7 shows one example of an on-demand database environment that may be suitable, depending on the application.

System Overview

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VB Script, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks.

Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT DATABASE ON-DEMAND DATABASE SERVICE issued Jun. 1, 2010 to Craig Weissman, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

Transparent Object Migration Overview

Force.com Custom Objects support a great deal of functionality. They represent a database table with typed fields and validation. They represent a Create, Read, Update, Delete (CRUD) API with web service verbs for Insert/Update/Delete/Undelete. They have significant relationship functionality including parent/child master/detail relationships which imply cascade delete, and lookup relationships that imply cascade set null. They support a deep-object recycle bin metaphor. They support complex business transactions with ACID properties of a relational database. They support a rich query API (SOQL) which includes joins, aggregation, multi-block reporting (child relationships), etc. They also support a Metadata API for transactional changes to the object definitions.

The original Custom Objects are implemented using a relational database as the backing store. However, we now support Custom Objects that are implemented using a non-relational store for the ultimate large amounts of data.

We have implemented the same functionality as above working on this non-relational store. In particular we have blended the use of our relational database to achieve the functional semantics of transactions and for other consistent book-keeping. At the same time at steady state for data that is not changing much we have implemented a more efficient and cheaper store that is the eventual repository of the data and where the efficient bulk query operations take place.

However, from the point of view of the end user visible functionality and API, this distinction is transparent. In fact we can also migrate objects (using, for example, a bulk copy of the large stationary data) from relational storage to non-relational storage, without the end user's API changing.

In one embodiment, incremental DML goes through the relational database and participates in real ACID transactions. Writes are temporarily written to the AppendLog but for query purposes this data is blended correctly with non-relational storage so that the results are correct in real time transactionally. All of our work around transaction observers and EntityObjects as part of our object/relational mapping framework are the same at this level regardless of eventual storage used.

In one embodiment, relational bookkeeping tables are used to maintain the recycle bin metadata for delete and undelete. This provides the list of children for a top-level delete operation. It also provides the list of foreign key values to restore on undelete. A physical delete process (async) cleans up stale rows after 30 days, regardless of the underlying storage system for the main rows.

In one embodiment, Query Optimizer statistics are kept in the same relational format because they are relatively small. They are cached using the same metadata caching system, whether or not the store is relational.

In one embodiment, the same API format (XML) is used for both types of custom objects In one embodiment, the query engine includes regular queries against single tables, as well as joined queries.

In one embodiment, techniques for distributing queries across multiple threads or nodes differ—whereas the underlying RDBMS may implement parallel query, for non-relational stores we implement query distribution or map/reduce functionality to break up workload outside of the database storage tier.

Vampire: Storage Engine Overview

The goals for vampire storage were to have a database that would allow for a large number of rows, a flexible schema, be horizontally scalable, use commodity hardware, and allow for a mixture of both OLTP and analytic queries. The data itself will often be the source/primary data—it is not a copy of data that lives elsewhere or is derived from another data source.

Terminology

Row A key, set of binary flags, and a set of key-value pairs.

Segment A building block of a table, with 1 or more of these encompassing a table.

Table The logical unit that represents a set of rows in the vampire database. A table physically consists of 1 or more segments.

Recent Changeset This is an in-memory structure that represents to capture changes (inserts/updates/deletes) from the on-disk version of the table.

Optimize The operation of creating a new segment out of 2 or more existing segments.

Varint A variable-length encoded integer. See protocol buffers, extprot, and others.

Segment's Files.

A segment is made up of a small number of immutable files.
1. Data This contains the actual rows of data in key ascending, sorted order
2. Bloom filter A bloom filter of the keys that exist in this segment
3. Block offsets A subset of the keys that appear in the data file, providing semi-random access to the block a key is in
4. Row Schemas All of the row schemas that are used in the segment File formats, Versioning In one embodiment, on-disk structures have version associated with them to allow for changes to the file formats. In one embodiment, one byte is generally enough which allows for 256 versions.

While we do not expect to require a file format change in the first version of the storage engine, it is worth mentioning how we would handle it. New code, which could read and write both version n and version n+1 would get rolled out. Then code would start writing only version n+1. The code to read version n would need to remain around until we could guarantee that no more data was around from that version.

File Formats, Segment Data File

The segment data file is made up of one or more blocks. Blocks are not fixed in size, but instead contain a specific number of rows, though the number may be variable between different blocks in a segment data file.

There may be a soft limit on the size of a segment. The files may need to be transferred around the network, to and from Fileforce and the Vampire servers. This will be configurable, but we can start with something like 500 Mb, for example. By soft-limit, we should make a best effort to stop adding blocks to a data file once it is either at the limit or approaching it, but it will not be a hard limit.

There is a trade-off between the size of the files and the number of files we will need to have open to answer a query.

Figure 15:
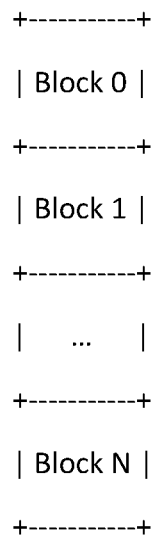
FIG. 15 illustrates file formats and a diagram of a segment file.

FIG. 15 illustrates File Formats, Diagram of a segment file.

Metadata about the segment. This will be persisted separately from the data file(s) in an RDBMS and likely will be cached. It will contain:
Fileforce information (ids, names, lengths)
File format version number
File Header
No need yet. To future proof ourselves we can use the segment metadata for versioning.
Block Data
Each block has a header, followed by row metadata and then data. The row metadata and the data may be compressed.

Figure 16:
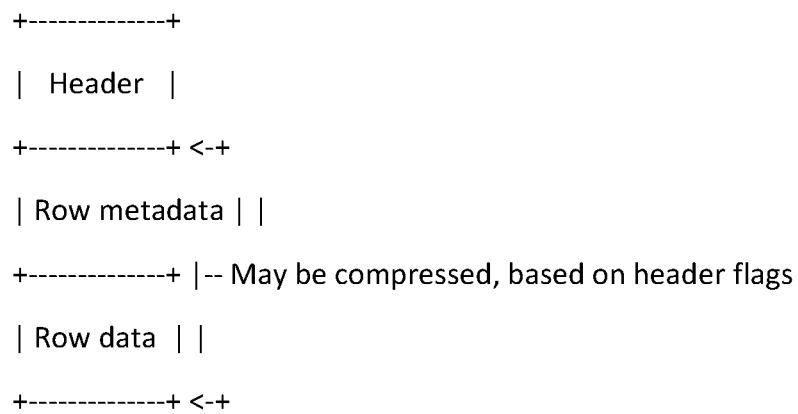
FIG. 16 illustrates header, row metadata, and row data and compression based on header flags.

FIG. 16 illustrates header, row metadata, and row data and compression based on header flags.

Block Header
1-byte version format
1-byte block flags
0 (Least Significant Bit): is block compressed
1: row offsets included in row metadata
2 . . . 7: unused
8 (Most Significant Bit): unused
2-byte number of rows in block
4-byte CRC checksum
4-byte unsigned int uncompressed block size (excluding header)
4-byte unsigned int compressed block size (excluding header)
16-bytes unused
=32-bytes total overhead per N rows
Row Metadata
Following the block header, we have all of the rows metadata. The format of the row metadata is tied to the version of the block. The row metadata would be compressed along with the rest of the data. The metadata includes:
value of the key
flags
schema—a lookup into the schema file. Omitted if the row is flagged for deletion.
The format is (byte[ ],varint,varint?)+

TABLE 3

| Key (byte[ ]) | Flags (varint) | Schema (varint) |
| --- | --- | --- |
| $Key_0$ | flags | schema |
| $Key_1$ | flags | schema |
| . . . | flags | schema |
| $Key_N$ | flags | schema |

The size of this should be on the order of ((N*average key length in bytes)+N+(N*~1). We would need to store the keys and flags somewhere anyways, so that basically comes for free. If we assume there typically less than 128 different schemas per block, this only adds one byte per row.
Key Format
The only allowed characters in user-generated keys are [A-Za-z0-9]. There are some reserved characters allowed in system generated keys, which also permit the usage of [!@#$%^&*-+/:.;?]. We will store the keys as byte[ ]s.

The maximum key length is 250 characters. This should be configurable.
Row Flags
This is single byte, per-row, bitset of metadata. These bits are currently defined as:

TABLE 4

| Bit Position | Value | Description |
| --- | --- | --- |
| 0 | Delete | Marks a row as deleted |
| 1 | Full Row | Indicates that a row contains a full set of values, rather than an incremental change. |
| 2 . . . 8 | Unused | |

Row Data
Row Data: Serialized Data Format
Although our tables are schema-less, each row must itself have a well defined schema of keys (column names) and values (row data). The only exception is for rows marked for delete which have no row data. For our prototype, we used JavaScript Object Notation (JSON) as our serialized form of a row. Other techniques may also be utilized.

With regards to speed: there is a significant cost to deserialization, and in order to do projection and filtering, you will need to deserialize the entire row. Regarding size, because JSON is a text based format, it means you pay a significant cost to represent non-text data. Binary data needs to be base64 encoded. Any integer larger than four digits takes up a byte per digit. And dates are extremely verbose in JSON.

In one embodiment, the Avro sub-project from Hadoop version 1.0 was released July 2009 may be utilized. It allows for unknown schemas, has fast deserialization and has a compact data format. While Avro can support schemas that are unknown ahead of time, you must still specify a schema when reading the data. These schemas are in JSON format and will be stored in the segment's schema file. Each schema will have a unique number. This unique number will be used to tag the row and is the schema number that appears in the row metadata. We assume that a majority of records within a block and segment will often have similar schemas, but this is not a requirement as a segment can have up to a varint's worth (231-1) of schemas. Avro was noticeably faster than JSON for both random reads and full scans.

There is an important demand on the application integration piece, which is that we will want all rows to be given with a canonicalized column order and with null values passed in. If we did not pass in the nulls, we would see an explosion in the number of row level schemas. There was a concern about the space overhead of having a sparse, mostly null, set of columns on the data file. In a benchmark, I added 500 null columns to a 5 million row data set. There was a 9.8% increase in file size associated with the extra columns. This seems reasonable. A benchmark on parsing schemas of varying size (from 50-500 fields), the average parse takes 0.5 ms. Given that, we can safely omit trailing nulls from a row's schema and get the benefits of speed without having an explosion in the number of schemas (it would grow linear to number of fields).
Row Data: Maximum Size
The vampire storage engine is not designed to store large binary objects (LOBs). In one embodiment, we will enforce an upper limit on the serialized size of any given row to be, for example, 1 Mb.
Row Data: Maximum Columns
In one embodiment, there will be a configurable number on the maximum numbers per row. We may use, for example, 1000 as this should be sufficient to cover the current 500 custom field limit in the application.

Row Data: Value System

Primitives:

string: Unicode character sequence bytes: sequence of 8-bit bytes int: 32-bit signed integer long: 64-bit signed integer float: 32-bit IEEE floating-point number double: 64-bit IEEE floating-point number boolean: a binary value null: no value Complex: records and fixed length byte arrays. Note that enums are not going to be supported due to the overhead of defining them in our row level schemas. Arrays, maps and unions are supported by Avro, but until we find a need for them, we will not be supporting them. In one embodiment, sfdc-application picklists may be stored using the actual picklist value, not the enum.

Row Data: Number Storage

There may be a need for a BigDecimal like data structure to mimic the number types that Oracle supports.

In one embodiment, our application supports a maximum of 18-digits of precision (total digits in the number), and the scale (digits to the right of the decimal) must be between 0 and the precision.

Row Data: Date Storage

In one embodiment, our application supports a date range of Jan. 1, 1700-Dec. 31, 4000.

Compression

Decompression of our blocks should be a fast operation. The easiest option is to use Java's java.util.zip.DeflaterOutputStream. This is likely to be our first implementation for compression.

In my current benchmarks, operating on 250,000 rows, decompression using data compressed using java.util.zip.Deflater.BEST_SPEED is taking approximately 850 ms and the row reads are taking around 265 ms. There are faster decompression options out there, such as LZO. While there is not currently a native Java implementation for LZO, Hadoop does offer access, in a way. Another option would be to look at is FastLZ, although this too has issues in that it is not Java native and they have yet to release a stable implementation.

Segment Bloom Filter File

Contains a bloom filter in serialized form.

Since we know the number of keys when we write out the segment, we can get a very low false positive rate. For example, for 10 million keys and a 1% false positive rate, we would use 11,981,323 bytes (~12 Mb).

Segment Block Offset File

Contains offsets into the data file for the first key in each block. These are the first key in a particular block to the offset in the file for that block. Given this, we can do a binary search plus a small scan to any given row in the segment. By reading this mapping into a binary search tree, we can use this to get to a near enough to our row without having to scan the entire data file.

The file format is the same as the segment data file. The file is stored in blocks, each with headers, row metadata, then data. In this case, the keys will be the block's key0s and the only column in the data would be an integer offset from the previous block. Since the rows in these blocks will be fairly skinny, we expect to be able to use a large number of rows per block.

As a possible optimization for large numbers of data rows, we may consider creating an offset file for the offset file (level-2 offsets). This file would contain offsets into the level-1 offset file. We are not yet sure if this optimization is needed yet and we will see how large numbers of data rows tests out.

Segment Schemas File

This represents all of the row schemas used in the segment. Any row, even within a block, can have a different schema. In one embodiment, each schema is serialized in JSON format, using Avro's schema format.

Schemas will change during metadata changes by the end-user. For example, adding a new field or dropping an existing field.

In one embodiment, the file format is the same as the segment data file. The file is stored in blocks, each with headers, row metadata, then data. In this case, the keys will be the sequence numbers used to tag a row's schema; and the data in the row would be a single column containing the schema. Since the rows in these blocks will be relatively skinny, we expect to be able to use a decent number of rows per block.

File Layout on Disk

In one embodiment, each vampire storage engine server will have a root directory which contains all its vampire data. It will be laid out in a hierarchical manner, similar to what we have done with both search indexes and fileforce:

/path to/root//path

/path to/root/last character of organization id//path

/path to/root/last character of organization id/organization id//path

/path to/root/last character of organization id/organization id/table id//path

/path to/root/last character of organization id/organization id/table id/segment(s) files The set of files that make a segment each share a unique name. This will likely be a sequence number. The unique segment is used as part of all the file names for that segment to help us with diagnostics. Eg:

segmentName.fileforceId.data segmentName.fileforceId.bloom segmentName.fileforceId.offset segmentName.fileforceId.schema Notes:

In one embodiment, this data is a cache of what is stored in Fileforce. Should we decide that this file layout is not performing well, we can blow it away and rebuild using a different hierarchy.

In one embodiment, the ids are 15-characters. For the search file system, we supported case-safe 18-character organization ids in order to allow for development on a Window's file-system.

The first 2 directory levels below root are to help avoid issues with file systems having too many files/directories in a single directory. For an organization id, such as 00D000000000123, the directory path would look something like /something/root/23/3/00D000000000123

There is an assumption that any given organization will not have too many different tables. We should be able to support north of 1,000. If we later decide this is not enough, we can always change this.

There is also an assumption that the total number of segments will not be large. Each segment is 4 files, so that would allow us to have ~250 segments. This should be fine, and we can always change this at a later date.

In order for us to minimize directory listings, which are not particularly fast, given an organization id and table name, we will be able to programmatically know the where the segment(s) are located on the server's disk relative to a root directory. Ideally, we would also know the information about the segments and their file names as part of the segment metadata we store in the RDBMS. The only filename we would need to know per segment would be the unique segment prefix.

Here is an example directory listing of organization 00D200000000w2v, table 0tb2000000003B6, with 2 segments call them 00001 and 000002:

/path to/root/v/00D200000000w2v/0tb2000000003B6/00001.ffxId1.data
/path to/root/v/00D200000000w2v/0tb2000000003B6/00001.ffxId2.bloom
/path to/root/v/00D200000000w2v/0tb2000000003B6/00001.ffxId3.offset
/path to/root/v/00D200000000w2v/0tb2000000003B6/00001.ffxId4.schema
/path to/root/v/00D200000000w2v/0tb2000000003B6/00002.ffxId5.data
/path to/root/v/00D200000000w2v/0tb2000000003B6/00002.ffxId6.bloom
/path to/root/v/00D200000000w2v/0tb2000000003B6/00002.ffxId7.offset
/path to/root/v/00D200000000w2v/0tb2000000003B6/00002.ffxId8.schema In-Memory Recent Changeset As changes are applied to a table, we want to be able to batch these changes up in memory until some threshold is reached before coalescing these changes out into a new segment file. This component is referred to as the recent changeset.

In one embodiment, this append log will behave as a special segment that differs from a normal segment in a few ways:
  mutable
  not persisted Data will be added to the recent changeset via flush operations from the database's append log.

Flush Thresholds

As memory is finite, and soft-state does carry some risks, we want to coalesce these changes and create a new segment from this data. This will be triggered by an optimize operation.

Indexes

Indexes are an optimization for faster query access, with the trade-off of maintenance and storage space. In one embodiment, the vampire storage engine will support indexes as a first-class entity, maintained synchronously during updates, inserts, and deletes of a table. The metadata about indexes will stored along with the table metadata in the RDBMS.

Format

Indexes will be stored as just another table. Special care will be given to the format of the keys stored in an index by using reserved characters to create a structure.

In one embodiment, the format of the key for index tables is:

IndexedValue[\u0000IndexedValue]+PrimaryKey

The \u0000 is a marker byte.

The row's schema is a single null value that is ignored for reads and updates:

{"type": "null"}

The following is an example on a contact table:

TABLE 5

| Key (ContactId) | Name | AccountId |
| --- | --- | --- |
| 00300123 | Joey Chestnut | 00101000 |
| 00300201 | Monta Ellis | 00102000 |
| 00300202 | Anthony Randolph | 00102000 |
| 00300405 | Takeru Kobayshi | 00101000 |

One index is the foreign key index on AccountId. Here is what that table (index) would look like:

TABLE 6

| Key (IndexId) |
| --- |
| 00101000\u000000300123 |
| 00101000\u000000300405 |
| 00102000\u000000300201 |
| 00102000\u000000300202 |

Notice that the keys are still unique and in sorted order. The value is simply a placeholder to mark the row's existence.

In order to put the index to use, we can run a scan on the accountId we are looking for, let's say 00101000 for this example. Because we know that our keys are in sorted order, we can start scanning at 00101000 and stop as soon as we hit a key that isn't equal to it. By parsing the keys that match the scan, we can accumulate all the primary keys that match (in this case, 00300123 and 00300405). We then can use these primary keys to lookup the actual rows in the primary contact table.

Note, the index does not work the same as a traditional RDBMS where the index contains an internal pointer to the row. While perhaps our indexes could maintain the segment and block numbers for rows, we are not pursuing that at this time.

A multi-column index would work similarly, additional care needs to be taken with the key generation. For example, if we wanted to index AccountId and OwnerId for contacts, the keys would follow this format: AccountId\u0000OwnerId\u0000ContactId Nulls We should be able to support nulls in columns, by simply omitting the indexed value. The \0000 marker byte will be our indicator.

Supported Indexed Value Types

We can look at oracle's format, icu4j's BigDecimal, as well as our own below:

EXAMPLES

TABLE 7

| −987 | '0'-3, '0'-9, '0'-8, '0'-7, 0 |
| --- | --- |
| −59.215 | |
| 305.10 | |

Index Maintenance

Index maintenance is fairly straightforward in this schema. The first step is formatting the key into the right structure, and then the rest of the work is fairly self-explanatory, with a small wrinkle for updates.

Inserts are added to the table's append log.
Deletes are added to the table's append log Updates are a delete of the old value's row added to the table's append log plus an insert of the new value to the append log.

Operation API

In general, we want the storage engine to be somewhat dumb. To that end, the public API should be fairly constrained and would not be exposed directly to clients.

Row Operations get single row scan range scan optimize segments and local in-memory recent changeset flush merge the database append log Operation Execution Execution: Get Retrieve a row from a specified table identified by key K and select the given fields F1 . . . Fn:

1. Starting with the table's newest segment, load the segment's bloom filter and check if K is likely in that segment (Sn). If false, proceed to the next newest segment and repeat. If there are no older segments, and a bloom match has not yet been found, the row does not exist.
2. Given Sn with a likely bloom filter match, we need verify if the bloom filter gave us a false positive or not by loading the block that contains the key.
3. Load Sn's block offsets, and binary search to find the largest block offset key that is less than or equal to K. This supplies the offset for the block that would contain K. It is possible that K is before the smallest entry in which case, the row does not exist in this segment. Return to step 1, this time starting at the next newest segment (Sn-1).
4. Load the block identified in the block offsets and first look in the row metadata for K. If not found, return to step 1, this time starting at the next newest segment (Sn-1).
5. Read the row using the schema specified by fields F1 . . . Fn and return the row using the schema resolution rules defined below.

Execution: Scan

Retrieve an iterator of rows from a specified table, given an optional starting key Kstart and optional ending key Kend, selecting the given fields F1 . . . Fn:

1. For each segment in the table, get an iterator positioned at the first key >=Kstart or the first key in the segment if Kstart is not specified.
2. Using a priority queue-like data structure, find the segments that are positioned at the smallest (by sort order) key
   a. If there is only one segment that has the current smallest key, this is the next row to return in the iterator
   b. If there are multiple segments that have the current smallest key, the newest segment's version of that row is the only one used. The other segment's iterators are all advanced to the next key.
3. Read the row using the schema specified by fields F1 . . . Fn and return the row using the schema resolution rules defined below.
4. Return to step 2 until all of the segment iterators are positioned at a value >Kend or have no more rows remaining in the segment.

Execution: Flush

This is where the writing of a segment happens. Data is flushed from the RDBMS to the storage engine to be written out. It is expected that the data comes to us in key sorted order.

Given an iterator over the data, for each row:
1. Add the key to the bloom filter
2. Track the schema for the row
3. Buffer the row into memory
4. If the in-memory buffer of rows has reached its threshold (number of rows or allocated size of rows), append the block
   a. Capture the location of the current end of the segment file, as this is the offset for the start of the new block
   b. Pass the offset and the first buffered key to the offsets
   c. Write the block headerxxxxx finally, write the bloom, close segment offsets, close the schemas Execution: Optimize As segments are added to the table, there is some additional cost to retrieval of records. The new segments must be checked for individual records and must also be included in scans. Also, when records are updated, the old version(s) of that data continues to exist in the old segments, taking up space, and time.

In order to keep performance up, there is a need to coalesce existing segments into new segments. The optimize operation reclaims the space wasted by updated records, and creates an ordered union of the segments that are coalesced.

The first step is identifying which segments should be coalesced:

Starting from the newest segment to the oldest, then do actual coalesce/rewrite.

Reads

Schema Resolution of Different Row Schemas

When a row's actual schema does not match the requested schema we need a mechanism to resolve the differences. For example, there may be fields that have been added or removed. As we rely on Avro for our record reading, we adhere fairly closely to their schema resolution rules.

For example, if the actual schema has a field that doesn't exist in the requested schema, it will be ignored and vice-versa.

Note, that the sfdc application supports converting a custom field from a number into string column, while preserving the existing data and custom field id. In order for us to support this, we will need to do a bit of fancy footwork with our reading. So, it appears that the number is read as number, and conversion to a string must happen in application code. I've emailed the avro-dev mailing list and awaiting a response to see if this can be handled at the Avro framework level.

Caches

We will almost certainly want some number of caches at various levels. Candidates include:

bloom filters parsed schemas segment metadata decompressed, deserialized blocks

As all of these of structures are immutable, we can safely cache them without having to worry about invalidations. Our options are to use heap memory, memcached, or both. We have limited amount of heap space that we can use for caches, so we will need to see how expensive the disk reads and processing are compared to using memcached. As our heap space is limited, we will need to use memory sensitive caches and lib.collection.SizedLruCache is likely a good fit for it.

Foreign Key Support

Now that the basic data types are working with app integration for Vampire we want to support foreign keys. In one embodiment, we do this first by enabling the Column-Type ENTITYID and the FieldType FOREIGNKEY as vampire enabled—in one embodiment, we use Utf8 for the native storage format in Avro, using an empty string to store nulls, as we do for other strings.

Foreign keys imply a large amount of functionality:

1. Object types: we will support lookup and master detail relationships between vampire objects. We will support lookups from vampire to oracle objects.

2. Related lists—the field types above imply that vampire object related lists can appear on either oracle or vampire object pages. In the code custom object related lists use FilterByDynsql—this is the first time the filter code path must support vampire, which it now will in a minimal way. We will share the vampire query generation that is already in place in the API 3. Lookups—for lookup relationships the edit UI allows picking the parent object. For lookups to other vampire objects this user interface implies a query against the name field. As it turns out this code also goes through the FilterByDynsql code path. We will hard-code a LIKE filter with the input text. Note that text is normalized to uppercase by the code and Vampire query supports exact equality.

4. API fk joins—we support SOQL queries that join two vampire objects with foreign keys.

4b. API child relationships—these now work as with related lists for either oracle or vampire parents. The same API code that weaves together these multi-cursor result sets just works with Vampire children. At the moment the mechanism for querying the children is to first query the child table by parent ids and bring the child ids into memory, and then do a child retrieve. This won't scale for highly skewed relationships. The code that does step 1 will give an error above 100,000 rows.

5. Cascade delete and undelete: we want to support the same rules that we do for oracle, with multiple levels of cascading. At the moment vampire top-level objects will cascade delete other vampire objects that are master/detail children, recursively. Also foreign keys will set null on the children. All of these things will be undone by undelete. We use the Oracle delete_event* tables for these vampire object rows—in other words the bookkeeping data for delete/undelete is stored in oracle, even for vampire effects.

Type System and EntityObject Integration

The primary integration point for Vampire will be via the concept of a custom object or SObject. Ideally, external APIs will remain the same (or throw appropriate error messages where they are not supported) for custom objects that are stored in Vampire versus Oracle.

For the time being with cold storage, an SObject will either be stored in Oracle or Vampire, but not both.

Controlling Flag

The story starts with a CustomEntityOption bit that determines (at object creation time) where the object is stored. This bit is loaded in our cached CustomEntityDefinition and it shows up in the Udd under EntityInfo.isVampireStored( ). Note that the MD API has an option (all of this is protected behind a perm) called "vampire" that can be set to turn on this flag.

Note that the audit trail for setup operations should work the same for these types of entities.

Child Components

Once an object is so defined, a subset of functionality on the custom object definition page (and Metadata API) is allowed.

Fields

For custom fields only a subset of column types will be supported, and this document deals with the serialization and storage format for those types.

FLS (and CRUD) are all handled in the app tier and should work normally.

A few other UI things in setup: field type changes are disabled in the setup UI.

A number of special field types are TBD and should be considered unsupported if not mentioned here: RecordType, Division, etc.

However, the following special field types are supported: CurrencyIsoCode (needed for currency fields of course), IsDeleted (needed for soft delete)

Supported Column Types

TABLE 8

| Type | Avro Schema Type | Storage Value |
| --- | --- | --- |
| Text (regular, multi-line, url, email) | Type.STRING | UTF8, with nulls recorded as empty string |
| Numbers: Decimal, Integer, Percent | Type.BYTES, with a property sfdcType=<columnType> | ByteBuffer filled with (shareBytes of an oracle.sql.NUMBER( ), or an empty byte array for null) |
| Date, Datetime | Type.BYTES, with a property sfdcType=<columnType> | ByteBuffer filled with (shareBytes of an oracle.sql.DATE( ), or an empty byte array for null) |
| Picklist | Type.BYTES, with a property sfdcType=<columnType> | ByteBuffer filled with string form of the integer value (as we do for Oracle). Can be switched to just integers. |
| Boolean | Type.BOOLEAN | Boolean |
| PK and Foreign Keys | Type.STRING | same as for strings above |

Picklists

We decided to store picklists using their int value as we do for Oracle for several reasons.
1. It's stable in the event of picklist rename
2. It's the same as Oracle and a whole lot of code just works
3. It's compact
4. Sorting has to be done with metadata from the app anyway Now picklists have special Oracle-specific utilities most of which are disabled for now
1. Picklist replace is disabled for now
2. Picklist map/delete value is disabled for now
3. Worst picklist—this should work in terms of the metadata about # of meta values, but no purging/sampling of the actual data should take place
4. Picklist stats page—again only metadata will show, no actual data EntityObject implementation:

Saving

For save we splice Vampire upsert( ) code into the low level save routine—we don't use a CallableStatement or anything like that.

For inserts the logic that is normally done in PLSQL (creation of a valid 15-char ID, populating of audit fields, etc.) is done in Java code immediately preceding the call to the Vampire upsert( ) command.

Note that for custom fields the Vampire field name will be the custom field id as opposed to the API name of the field—for stability purposes in the event that fields are renamed.

Loading

For loading we splice a call to retrieve in where we typically call Oracle's get_base_row_plsql routine. This is done by providing an implementation of ResultSet (VampireResultSet) for vampire-stored objects. Later this resultset is sent into the various FieldObject's which call the appropriate getXXX( ) routines such as getString( ), getBigDecimal( ), getTimestamp( ), etc. These all need to return the appropriate values. Note that getString( ) is called on fields that are not strings (e.g. Numbers) so we need to support this same iteration as the Oracle jdbc driver does.

Note that FieldObject's currently expect to use resultset column aliases that correspond to physical Oracle names (e.g. valXXX) so we need to initialize VampireResultSet with this knowledge.

Vampire Indexing

Indexes are an essential optimization for faster query access, with the trade-off of maintenance and storage space. The vampire storage engine will support indexes as a first-class entity, maintained synchronously during updates, inserts, and deletes of a table. The metadata about indexes will be available through the custom index metadata already available through existing APIs. This metadata will be passed over to the Vampire server as necessary.

Index Format and Storage

Indexes will be stored as just another Vampire table, partitioned by organization id just like other tables. The key of the index will be formed by concatenating the bytes of the indexed column values and the pk of the row being indexed. The row pk must be included in the index key to ensure uniqueness. The data of the index row will be either empty or will be the values of the non indexed columns, depending on the configuration of the index. When the data is empty, an extra retrieve via the row pk will be required while otherwise it wouldn't (i.e. space/performance tradeoff). The row flags will have the same semantics as with vampire data tables (currently only a delete flag set to indicate the row has been deleted).

The key of the index row will be formed by concatenating the byte value of each indexed column terminated by a separator byte and followed by the data row key byte as show below:

TABLE 7

| $col_1$ value | separator | $col_2$ value | separator | row pk |
| --- | --- | --- | --- | --- |
| n bytes | 1 byte | n bytes | 1 byte | n bytes |

A single zero byte value will be used as a terminator for each column value in the key to allow our standard bytes comparator to be used to determine the sort order. A zero byte value works because it cannot occur inside of a data value with the following exceptions:
  NUMBER which represents negative infinity with a single byte value of 0.
  Boolean which represents False as a single byte value of 0.

In one embodiment, we will add 1 to the first byte of an indexed column value when it has a length of 1. This can never cause an overflow because we can never have a single 255 byte value for any supported data type (the first byte of a NUMBER may be 255, but it's length would always be more than 1 in this case). This manipulation has no effect on the index row sort order and it is easily reversed when the data values are retrieved back from the index row key.

For UTF-8 encoded strings, neither 0 or 255 are legal byte values.

For DATE, neither 0 or 255 are legal byte values:
  The first byte is for the century, where >100 is AD, and <100 is BC. The Oracle supported date range is −4712 to 9999, thus the first byte will have a valid range of 53 (i.e. 100-47) to 199.
  The second byte is for the decade, and is always from 1 to 100 (i.e. both 2000AD and 2001BC are represented as 100).
  The remaining bytes are all 1 based (1-12, 1-31, 1-24, and 1-60).

Null Values

Null indexed column values are represented as an empty byte array. Given our zero byte separator used in the index row key, this will force null index column values to be grouped together at the beginning of each section, before any legal values for that column (see example below).

Note that if we need to support both null values appear at the beginning as well as at the end of the index, we could change our byte value representation of null to a single byte value of 255. This would be unambiguous because, as described above, 255 is not a legal data value. Then the null indexed column values would all appear at the end instead.

By having a uniform separator representation and a uniform null value representation we ensure that will be able to both a) construct the index keys over which to search and b) dissect index keys into column values without needing the column type information. See the Index Usage section below for examples on construction of the index keys used for the range scan.

Type System Restrictions

This indexing format implies that our type system would initially be restricted to the following set:
  UTF-8 encoded String
  Oracle NUMBER
  Oracle DATE
  Boolean Avro encoded numbers, for example, would break the assumptions made here. If necessary, other data types could be added that meet the above criteria.

Example, for the following Employee table with a composite index on Salary and Hire Date:

TABLE 10

| Id | Name | Hire Date | Salary | Address | Country |
|---|---|---|---|---|---|
| 001 | Claudio Pinto | Feb. 10, 2005 | null | 4 Eye Lane | USA |
| 002 | Lee Redmond | Jun. 25, 2008 | 50 | 33 Nail St | USA |
| 003 | Les Stewart | Mar. 1, 2009 | 50 | 43 Carpal Tunnel | Australia |
| 004 | David Alexander | null | 30 | 121 T St. | USA |

Below is an example of the index keys and values (pretend these are all in binary) for an index in which the non indexed columns are stored inline:

TABLE 9

| Key | | | | | Data | | | |
|---|---|---|---|---|---|---|---|---|
| Salary | | Hire Date | | Id | Flags | Name | Address | Country |
| 30 | 0 | | 0 | 004 | 0 | David Alexander | 121 T St. | USA |
| 50 | 0 | 2008 Jun. 25 | 0 | 002 | 0 | Lee Redmond | 33 Nail St | USA |
| 50 | 0 | 2009 Mar. 01 | 0 | 003 | 0 | Les Stewart | 43 Carpal Tunnel | Australia |
| 0xff | 0 | 2005 Feb. 10 | 0 | 001 | 0 | Claudio Pinto | 4 Eye Lane | USA |

If the index was specified as not having the non indexed columns stored inline, the Data part of the rows above would just be empty. The flags of each row is set to 0 to indicate that the row is not deleted, just as with other Vampire tables.

Index Maintenance

The index will be maintained on the server side through the SyncTableCache object. This object is responsible for maintaining a snapshot of the unflushed rows for each Vampire table to ensure that all operations are working off of up-to-date data. The index table will be updated at the same time that the data table is updated. The index rows will be manufactured here based on the changes to data rows that have indexed columns:

Deleted data rows will cause the corresponding index row to be deleted

Inserted data rows will cause the insertion of the corresponding index row

Updated data rows will cause the deletion of the old index row and the insertion of the new index row.

Inserting the new index rows will be easy, since the cache has the current column values needed to form the index key. Deleting the old index rows will be a little more work. We'll need to do a retrieve of the prior column values (i.e. current_sequence_number minus one) in order to form the correct index row key. Since the vampire data is always immutable, we're guaranteed to retrieve the correct value (i.e. the data can't change out from under us). However, it may be an expensive operation since it may require going to disk to find the rows. It's possible that this retrieval could be delayed until a retrieve of the row occurs or a flush of the data is performed, but it'll still need to be done at some point. Our initial implementation will do the retrieve immediately.

Atomicity

Since the index rows will be written in a different table than the data rows, the atomicity of these two separate updates must be guaranteed. They must both either succeed together or fail together. Otherwise, incorrect results will potentially be returned for queries using indexed columns. Because the index rows will always be flushed together with the data rows in the same flush operation, this will already be handled with our two-phase commit implementation. We first write to Fileforce, and then, we commit that information to Oracle about the new segments. Only if both succeed, is the flush/optimize a success.

Update Behavior

Unlike in SQL which allows a row update on a subset of the table columns, our current implementation forces the client to send over the entire row with all of its row values. This row will replace/shadow any existing row. This forces our clients to do a retrieve first, update the column values that are being changed, and then do an upsert. Since for any table with at least one index we'll do a retrieve anyway (as described in Index Maintenance section above), we can instead simply always do a retrieve and subsequently surface a SQL UPDATE statement that allows a subset of the columns to be updated.

Index Metadata

The index metadata will be defined by the Custom Index object which is cached in the Udd. The metadata will be sent through requests to Vampire server as part of the TableSpec object. This is already optimized to not be resent unless the sequence number changes. To force a resend of the index metadata, the corresponding Vampire sequence number will be bumped up for that table/org combination upon any index creation or deletion. The Custom Index metadata will be interpreted as indicated below (along with the subsequent limitations for the initial implementation):

IndexNum will be used as the index number in Vampire

FieldEnumOrId and Field2EnumOrId (if present) will define the indexed column names. This will limit us to two columns for a composite index, but since this would not need to include organization id, this will be sufficient for an initial implementation. We can add more columns in core.custom_index or generalize a bit to be able to define more indexed column names in the metadata for Vampire custom objects.

IsActive will be used to indicate when the index has been completely created and may start to be used by queries.

In one embodiment, we can support case folded values for text columns to support case insensitive searches.

All non indexed column values will be stored in the data section of the index row to form a fully covered index. When we generalize the metadata to include more column names for composite indexes, we can also add a field to store a subset of the non indexed column names as the covered columns. There is a lot of value in having even some of the rows in the data without having to have all of them. It would be like a list of columns to be stored instead of a boolean on/off. This may be considered the equivalent of adding columns to a database index to make it be a "covering" index.

Index Stats

The index stats will be calculated through normal Vampire queries and then stored in the existing stats tables. When an index has been completely built (i.e. when it's marked as active), the stats will be calculated. After that, a scheduled batch process will periodically update the stats. Below are the queries used to gather the stats:

SELECT count(Id) totalCount,count_distinct(<first indexed field>) distinctCount FROM <data table>

SELECT <first indexed field> value, COUNT(Id) totalCount FROM <data table> GROUP BY <first indexed field> HAVING COUNT(Id)>100

Representing the Vampire index metadata with our standard Custom Index metadata and collecting the stats in the standard stats tables will enable the existing query optimizer to be integrated with more easily.

Index Creation

Often times an index will be added to a table that already has a lot of data. In this case, the index will be created in the background through a queued, reliable, and restartable process. To accomplish this, a new mode of optimize will be introduced for index creation that'll piggyback on the existing queue and client/server interaction code as follows:

Run optimize in the new index creation mode for all existing data segments.

Modify the optimize save logic to write out new index segments instead of data segments during index creation.

Create index rows for any unflushed data rows.

Enable incremental index maintenance to cause the creation of index rows for any data that changes while index creation is in progress.

Mark the index as active when index creation is complete to enable queries to begin using it.

Because the optimize queue will be used for both optimize and index creation, it will mean that for a given org/table_enum_or_id combo these operations will happen serially. This could be relaxed by allowing multiple index creations on the same org/table_enum_or_id since each of these will create different index tables and thus be independent of each other.

In addition to supporting the manual creation of Vampire indexes through the creation of a Custom Index, we will also implicitly create the following Custom Indexes on a Vampire Custom Object:

on the Name field on each foreign key field (Lookup and Master/Detail)

Index Scrutiny

A standard scrutiny task will be created that will analyze an index, adding missing index rows for existing data rows and deleting index rows for non-existent/deleted data rows.

Index Usage

Index usage will be come in two flavors:

Explicit usage by joining against the Vampire index table in cases where we know that an implicit custom index exists. Examples include queries against the Name field and foreign key traversal over Lookup and Master/Detail relationships.

Implicit usage when the query optimizer determines that the query would be most cost effective when leading with the index table. The appropriate join against the data table would be included by the query optimizer (if necessary) and the filter conditions would determine the makeup of the index key.

The makeup of the index key in the query produced by the query optimizer will depend on the operators used in the query expression. Since the primary key is included in the index row key, the filter conditions in the optimized query would only use >, <, or STARTS_WITH for index key comparisons. When the original query uses =, >=, and <=expressions, STARTS_WITH would be used for index key expressions since it is inclusive. For an equality expression, our byte separator (0x0) would be appended to the end of the key, while otherwise it wouldn't. When the original query uses > or <expressions, > or <expressions would be used in the optimized query for index key comparisons. To prevent null values from being included in the range scan, our byte separator (0x0) will define the lower bound of the range scan.

Usually a join between the index table and data table will be required. However, if a query only needs indexed and covered columns, the join against the data table would not be necessary.

Below are some examples of queries and their optimized form.

Examples

Using the Employee table with the Salary, HireDate composite index from before, the following queries would cause a range scan using the following keys.

TABLE 11

| Original Query | Optimized Query | Notes |
| --- | --- | --- |
| SELECT * FROM Employee e WHERE salary < 50 | SELECT e.* FROM Employee.1 i, Employee e WHERE i.Id > 0x0 AND i.Id < 50 | A non inclusive lower bound key against our null value is required since null salary values would be at the beginning and need to be filtered out. |
| SELECT * FROM Employee e WHERE salary >= 50 | SELECT e.* FROM Employee.1 i, Employee e WHERE STARTS_WITH(i.Id,50) | No upper bound key is required since null salary values would be at the beginning. |
| SELECT * FROM Employee e WHERE salary = 50 AND hire_date> '01-01-2009' | SELECT e.* FROM Employee.1 i, Employee e WHERE i.Id > 50 0x0 2009-01-01 AND STARTS_WITH(i.Id, 50 0x0) | The 0x0 separator byte is appended to the salary value because of the equality expression. The STARTS_WITH is necessary so that the range scan stops when salary values greater than 50 are encountered. |

TABLE 11-continued

| Original Query | Optimized Query | Notes |
| --- | --- | --- |
| SELECT * FROM Employee e WHERE salary = 50 AND hire_date < '01-01-2009' | SELECT e.* FROM Employee.1 i, Employee e WHERE STARTS_WITH(i.Id, 50 0x0) AND i.Id < 50 0x0 2009-01-01 | The 0x0 separator byte is appended to the salary value because of the equality expression. The STARTS_WITH is necessary so that the range scan stops when salary values less than 50 are encountered. |
| SELECT Id FROM Employee e WHERE salary = 50 AND hire_date = '03-01-2009' | SELECT EXTRACT(i.Id) FROM Employee.1 i WHERE STARTS_WITH(i.Id,50 0x0 2009-03-01 0x0) | No join against the data table is required since only the PK is being returned. The EXTRACT function would extract the PK from the index key. The STARTS_WITH is used and the 0x0 separator byte is appended after each value since only equality expressions are used. |
| SELECT * FROM Employee e WHERE salary IS NULL AND hire_date > '01-01-2005' AND hire_date <= '01-01-2006' | SELECT e.* FROM Employee.1 i, Employee e WHERE i.Id > 0x0 2005-01-01 AND STARTS_WITH(i.Id, 0x0 2006-01-0) | The empty byte value is used because of the NULL salary column value check. The STARTS_WITH is used because of the <= expression. |
| SELECT * FROM Employee e WHERE salary >= 50 AND hire_date < '12-31-2008' | SELECT e.* FROM Employee.1 i, Employee e WHERE STARTS_WITH(i.Id, 50) | In this case, only the salary column filter expression could be part of the key. The hire_date expression would need to be evaluated afterwards on the matching rows. |

Figure 8:
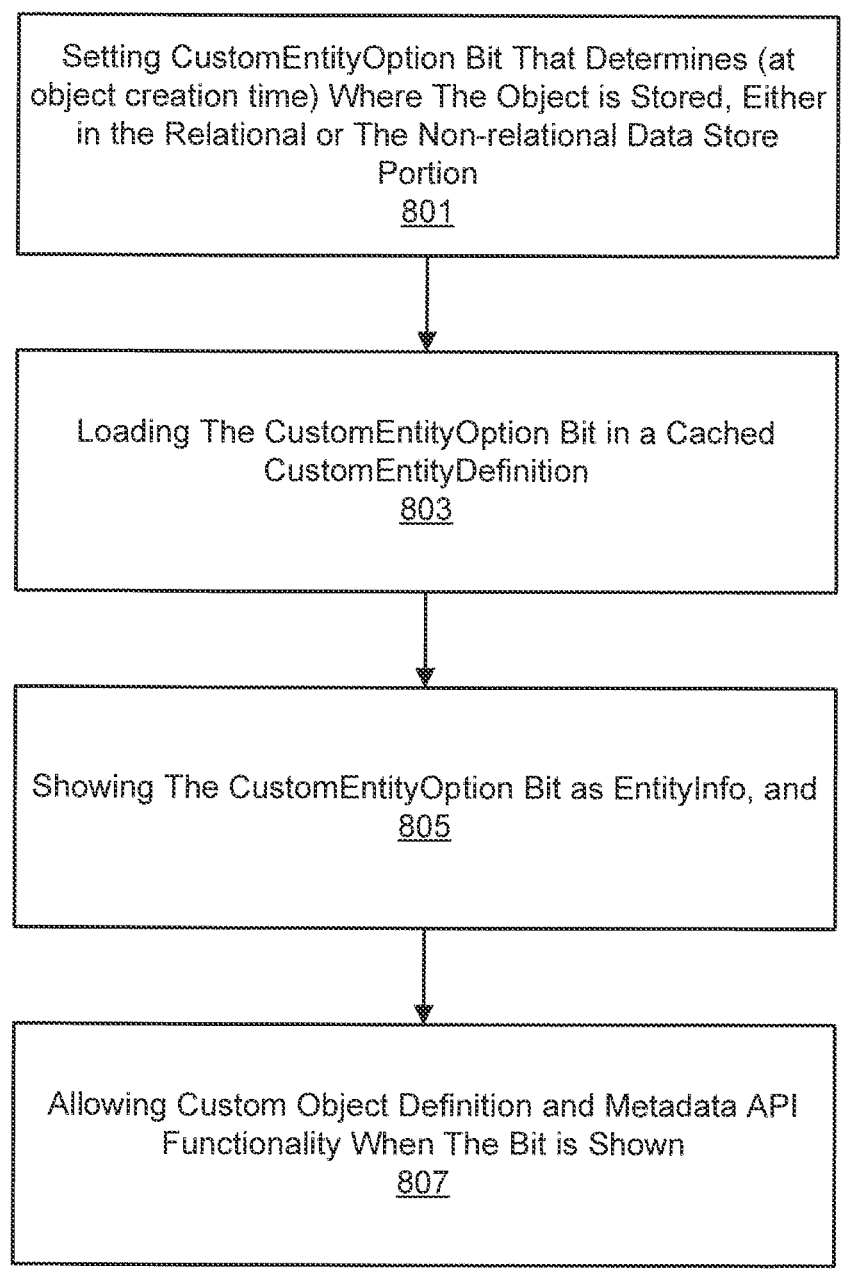
FIG. 8 is an operational flow diagram illustrating setting a control flag for a combined data repository in an embodiment.

FIG. 8 is an operational flow diagram illustrating setting a control flag for a combined data repository in an embodiment. At block 801a CustomEntityOption bit is set that determines (at object creation time) where the object is stored, either in the relational or the non-relational data store portion. At block, 803, the CustomEntityOption bit is loaded in a cached CustomEntityDefinition.

At block 805 the CustomEntityOption bit is shown as EntityInfo, and at block 807 custom object definition and Metadata API functionality is allowed when the bit is shown.

Figure 9:
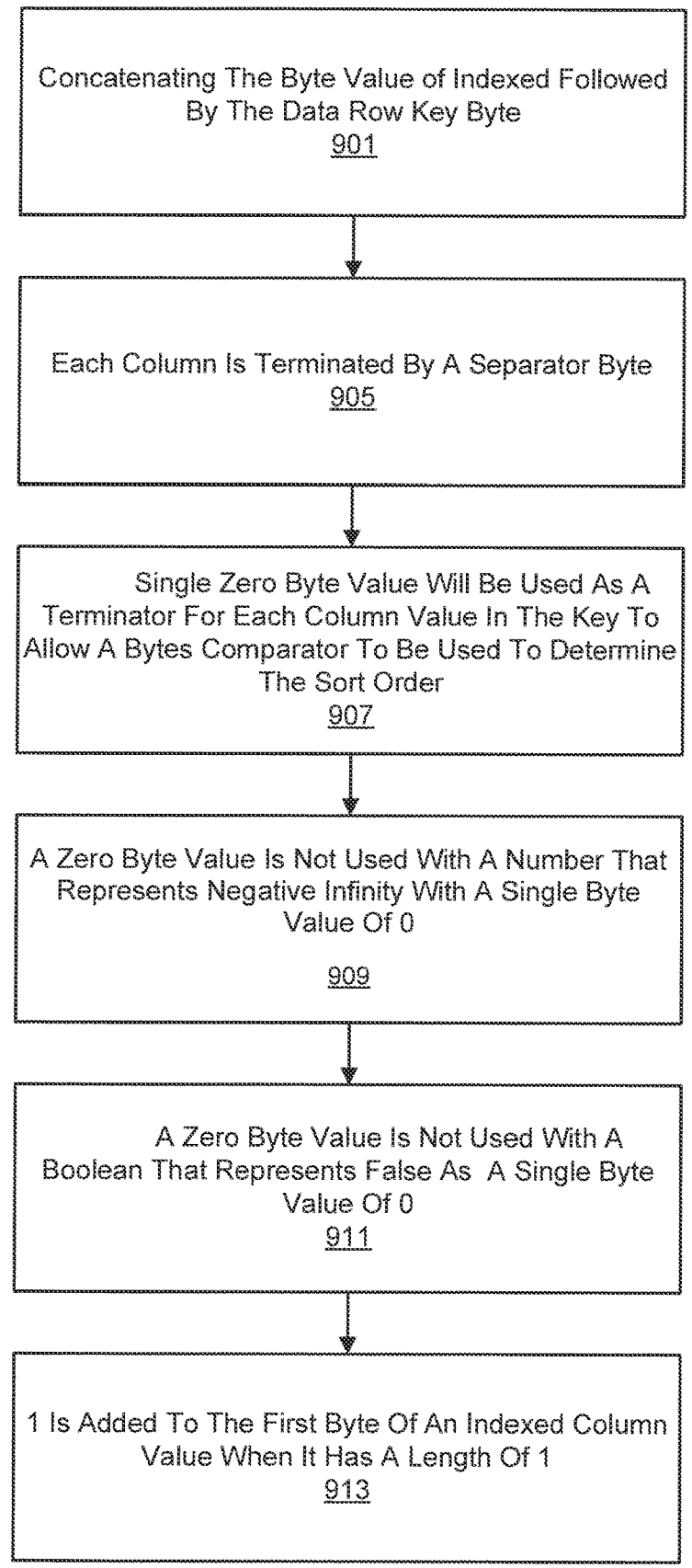
FIG. 9 is an operational flow diagram illustrating search index row key formation in an embodiment.

FIG. 9 is an operational flow diagram illustrating search index row key formation in an embodiment. At block 901, the byte value of indexed followed by the data row key byte is concatenated. In one example, concatenating includes concatenating each indexed column. At block 905, each column is terminated by a separator byte.

At block 907, a single zero byte value will be used as a terminator for each column value in the key to allow a bytes comparator to be used to determine the sort order. At block 909, a zero byte value is not used with a number that represents negative infinity with a single byte value of 0. However, at block 911 a zero byte value is not used with a Boolean that represents False as a single byte value of 0. At block 913 1 is added to the first byte of an indexed column value when it has a length of 1.

Figure 10:
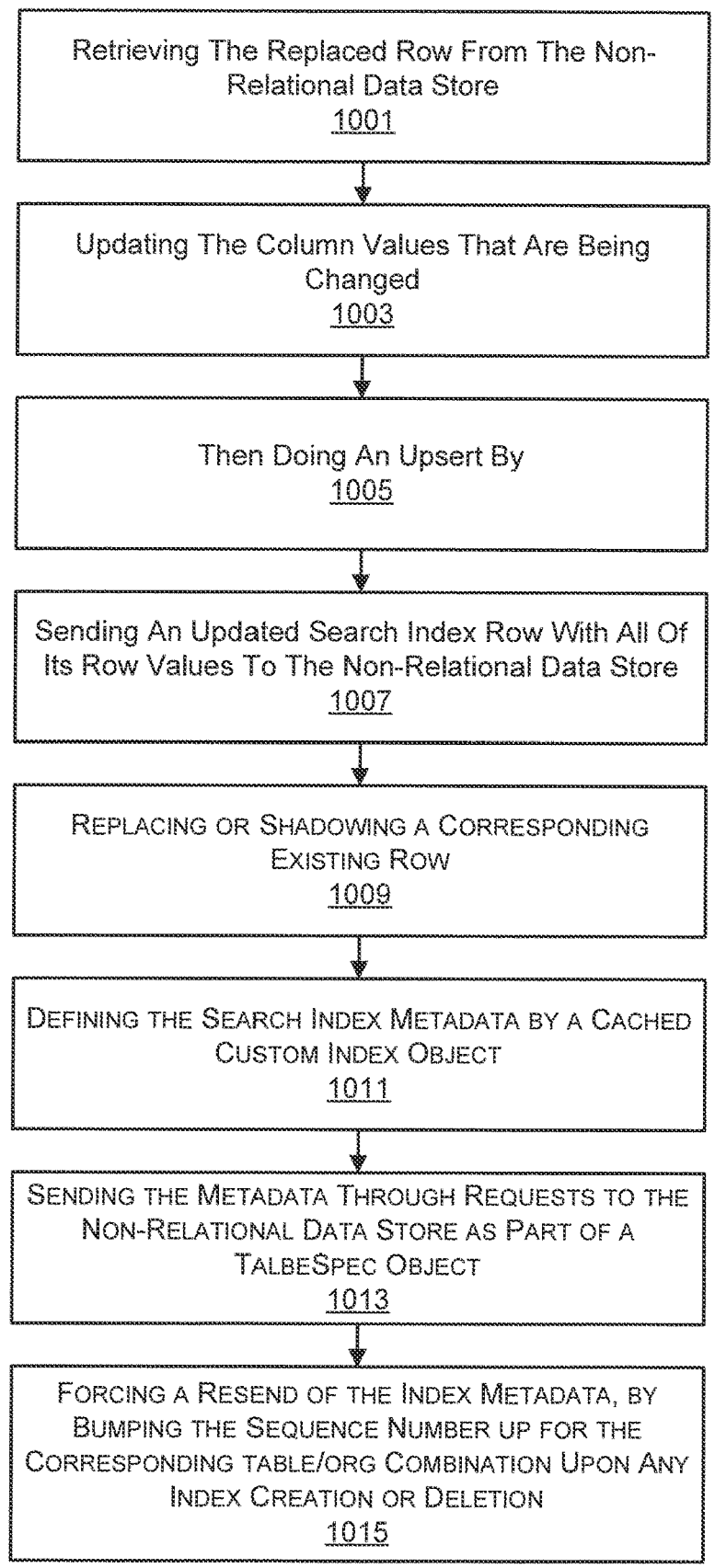
FIG. 10 is an operational flow diagram illustrating an index metadata update for a combined data repository in an embodiment.

FIG. 10 is an operational flow diagram illustrating an index metadata update for a combined data repository in an embodiment. At block 1001, the replaced row is retrieved from the non-relational data store. At block 1003, the column values that are being changed are updated, and at block 1005 an upsert is done.

The upsert is done at block 1007 by sending an updated search index row with all of its row values to the non-relational data store, and at block 1009 replacing or shadowing a corresponding existing row. In one example, updating includes surfacing a SQL UPDATE statement that allows a subset of the columns to be updated.

At block 1011 the search index metadata is defined by a cached Custom Index object. At block 1013 the metadata is sent through requests to the non-relational data store as part of a TableSpec object, and at block 1015, a resend of the index metadata is forced by bumping the sequence number up for the corresponding table/org combination upon any index creation or deletion.

Figure 11:
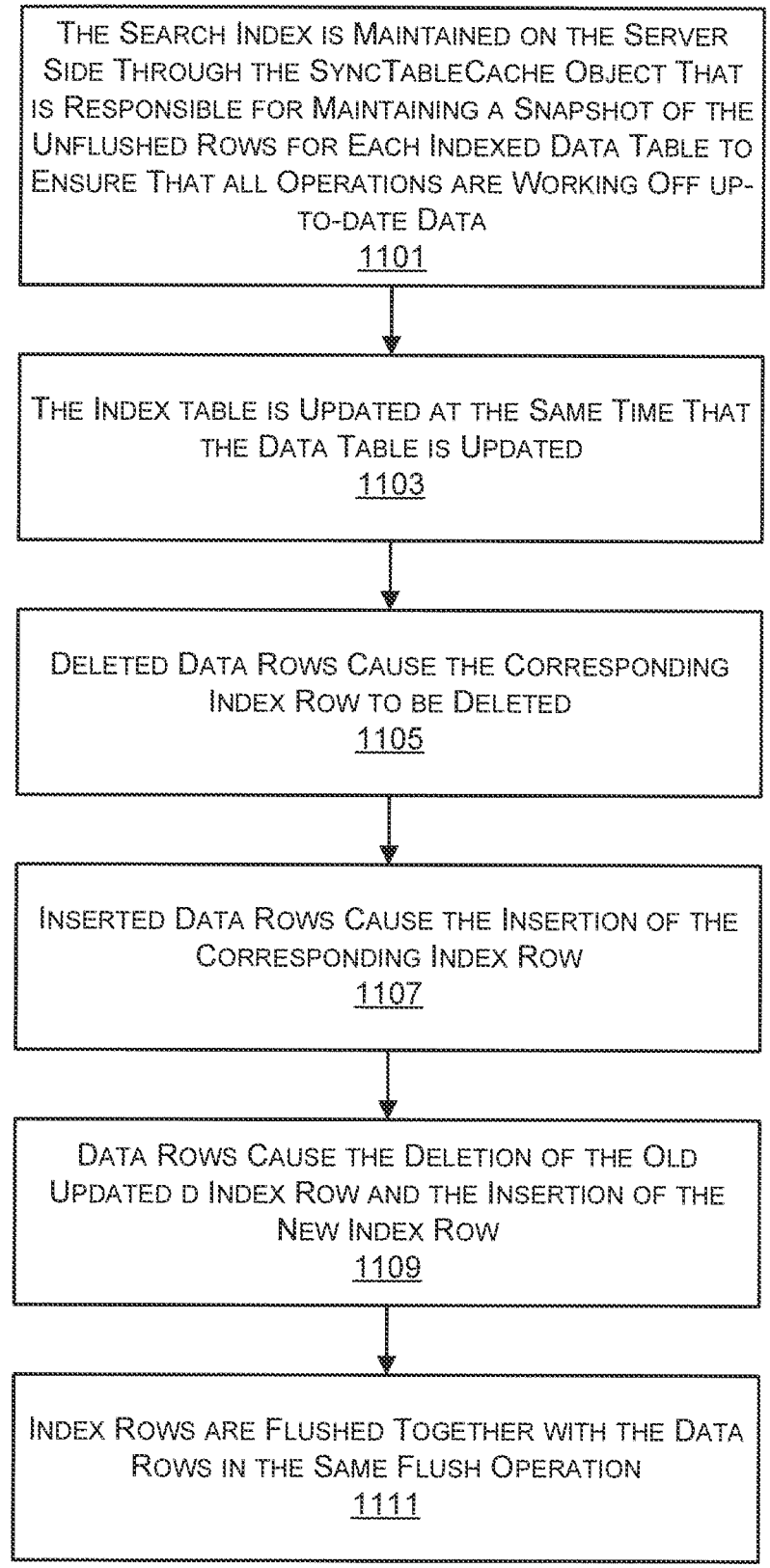
FIG. 11 is an operational flow diagram illustrating index maintenance for a combined data repository in an embodiment.

FIG. 11 is an operational flow diagram illustrating index maintenance for a combined data repository in an embodiment. At block 1101, the search index is maintained on the server side through the SyncTableCache object that is responsible for maintaining a snapshot of the unflushed rows for each indexed data table to ensure that all operations are working off of up-to-date data. At block 1103, the index table is updated at the same time that the data table is updated.

At block 1105, deleted data rows cause the corresponding index row to be deleted. At block 1107, inserted data rows cause the insertion of the corresponding index row. At block 1109, updated data rows cause the deletion of the old index row and the insertion of the new index row, and at block 1111, index rows are flushed together with the data rows in the same flush operation.

Figure 12:
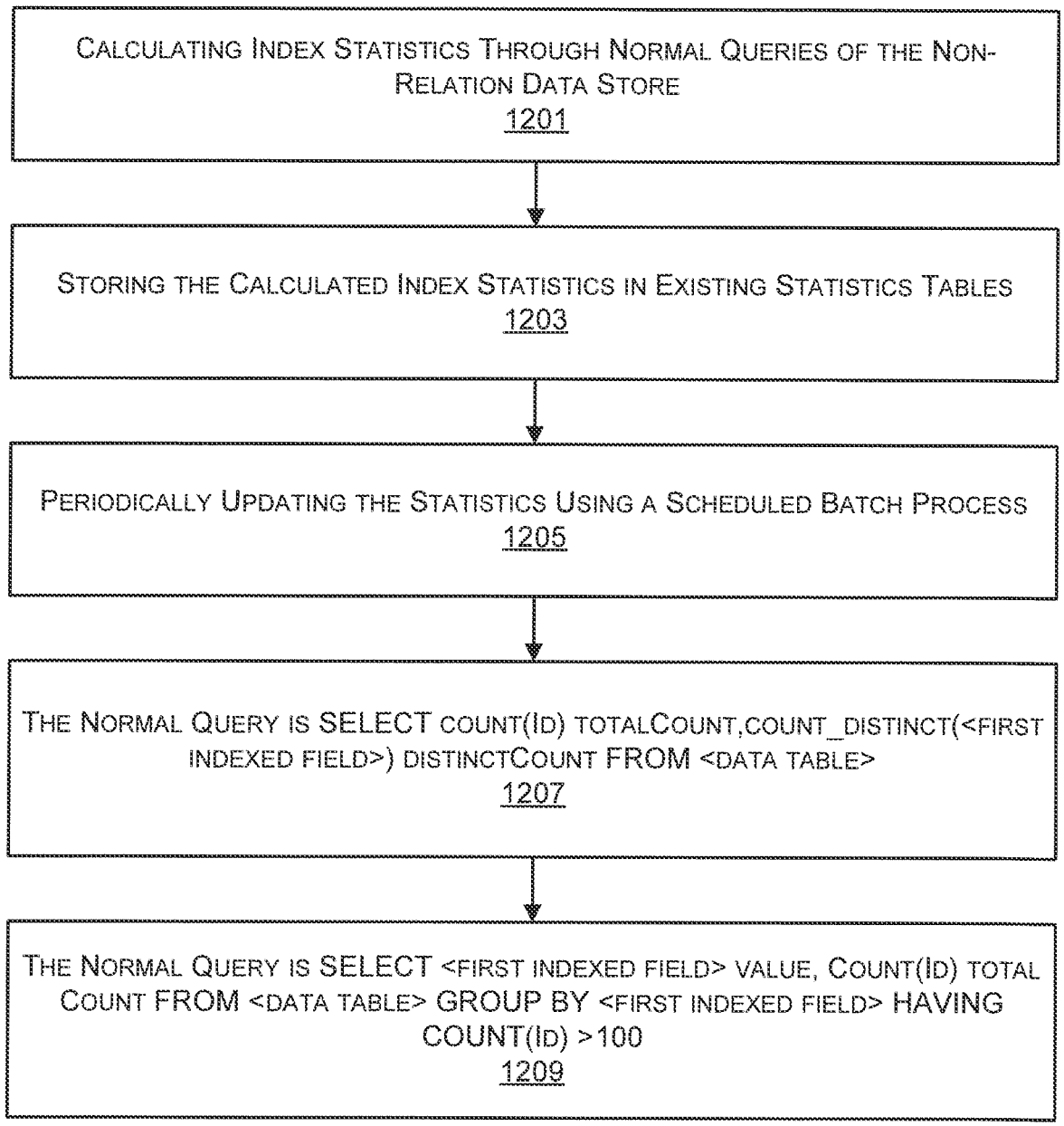
FIG. 12 is an operational flow diagram illustrating index statistics maintenance for a combined data repository in an embodiment.

FIG. 12 is an operational flow diagram illustrating index statistics maintenance for a combined data repository in an embodiment. At block 1201, index statistics are calculated through normal queries of the non-relational data store. At block 1203, the calculated index statistics are stored in existing statistics tables, and at block 1205 the statistics are periodically updated using a scheduled batch process. In one example, calculating the index statistics is performed when an index has been completely built. In one example, calculating the index statistics is performed when an index is marked as active.

At block 1207 the normal query is
SELECT count(Id) totalCount,count_distinct(<first indexed field>) distinctCount FROM <data table>

At block 1209, the normal query is
SELECT <first indexed field> value, COUNT(Id) totalCount FROM <data table> GROUP BY <first indexed field> HAVING COUNT(Id)>100

Figure 13:
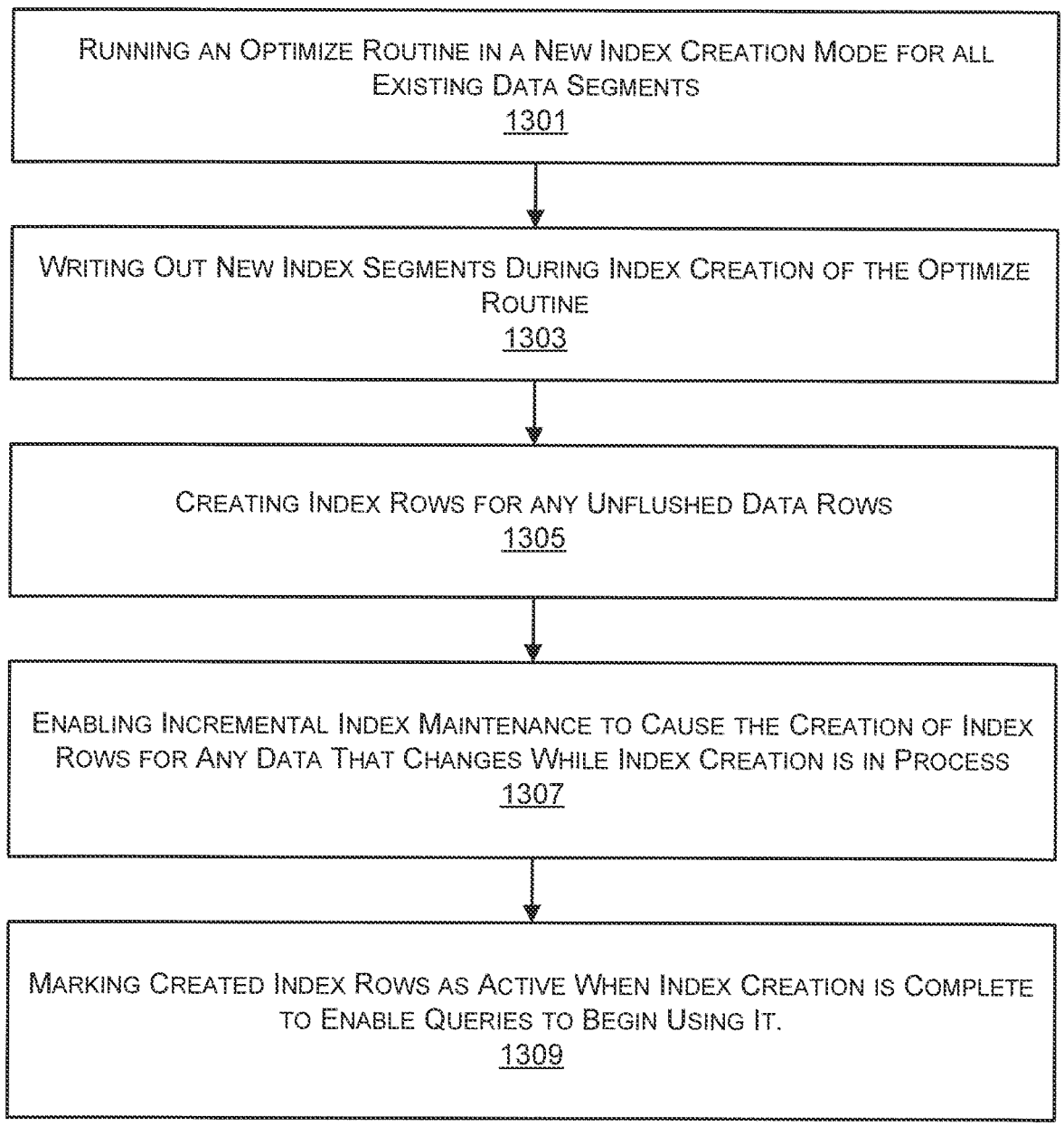
FIG. 13 is an operational flow diagram illustrating index creation for a combined data repository in an embodiment.

FIG. 13 is an operational flow diagram illustrating index creation for a combined data repository in an embodiment. In FIG. 9 updating the column values includes several operations. At block 1301, an optimize routine is run in a new index creation mode for all existing data segments. At block 1303, new index segments are written out during index creation of the optimize routine. At block 1305, index rows for any unflushed data rows are created.

At block 1307, incremental index maintenance is enabled to cause the creation of index rows for any data that changes while index creation is in progress, and at block 1309, created index rows are made as active when index creation is complete to enable queries to begin using it.

FIG. 14 is a block diagram illustrating an index metadata structure for a combined data repository in an embodiment. The custom index metadata structure may be used in a combined data repository having a relational data store portion and a non-relational data store portion. The structure includes IndexNum 1401 used as an index number, FieldEnumOrId 1403 to define indexed column names, and Field2EnumOrId 1405 to define additional indexed column names as a composite with FieldEnumOrId.

The structure may also include IsActive 1407 to indicate when the index has been completely created and may start to be used by queries. More columns can be added in core.custom_index as well as a generalized bit to define more indexed column names. As illustrated, the structure includes an organization id 1409 a field 1411 to store a subset of non indexed column names as covered columns.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. In a combined data non-transitory repository having a relational data store and a non-relational data store, a method comprising:
   defining, based on a cache custom index object, a search index associated with column values and metadata;
   sending the search index to the non-relational data store using one or more requests as part of an object;
   retrieving a replaced row from the non-relational data store;
   modifying the search index by at least one of (a) sending an updated search index row with its row values to the non-relational data store, and (b) replacing or shadowing a correspondingly existing search index row with the updated search index row;
   calculating index statistics through normal queries of the non-relational data store;
   storing the calculated index statistics in existing statistics tables; and
   resending the search index to the non-relational data store by incrementing a sequence number up for a corresponding combination of the statistics tables and organizations upon creation or deletion of an index, wherein the statistics tables are periodically updated using a scheduled batch process.

2. The method of claim 1, wherein modifying is performed simultaneously with updating of the non-relational data store, and wherein the search index metadata is maintained at a server computing device through a cache object that is responsible for maintaining a snapshot of unflushed rows for index data tables to ensure one or more operations are performed based on up-to-date data.

3. The method of claim 1, further comprising:
   running an optimized routing in a new index creation mode for existing data segments;
   writing out new data segments during index creation of the optimized routing;
   creating index rows for one or more unflushed data rows;
   enabling incremental index maintenance for facilitating the creation of index rows for data that changes while the creation of index rows is in progress; and
   marking the created index rows as active to enable queries to use the created index rows.

4. A combined non-transitory data repository comprising a data processing device coupled to a relational data store and a non-relational data store, the data processing device of the combined data repository to perform operations comprising:
   retrieving a complete search index row from the non-relational data store, the search index row having a plurality of columns having row values containing metadata about the search index row;
   updating the metadata and at least a portion of the row values of the plurality of columns to form an updated search index row having the plurality of columns, wherein a subset of the plurality of columns corresponding to the portion of the row values is updated;
   sending the updated search index row with its row values to the non-relational data store, wherein the updated search index row replaces the search index row;
   modifying a search index associated with the updated search index row by at least one of (a) sending the updated search index row with its row values to the non-relational data store, and (b) replacing or shadowing a correspondingly existing search index row with the updated search index row;
   defining search index metadata using a cached custom index object;
   sending the search index metadata to the non-relational data store using one or more requests as part of a specified object;
   calculating index statistics through normal queries of the non-relational data store;
   storing the calculated index statistics in existing statistics tables; and
   resending the search index metadata to the non-relational data store by modifying a sequence number for a corresponding combination of the statistic tables and organizations upon creation or deletion of an index, wherein the calculated index statistics of the statistics tables are periodically updated using a scheduled batch process.

5. The combined data repository of claim 4, wherein modifying is performed simultaneously with updating of the non-relational data store, and wherein the search index metadata is maintained at a server computing device through a cache object that is responsible for maintaining a snapshot of unflushed rows for index data tables to ensure one or more operations are performed based on up-to-date data.

6. The combined data repository of claim 4, wherein the operations further comprise:
running an optimized routing in a new index creation mode for existing data segments;
writing out new data segments during index creation of the optimized routing;
creating index rows for one or more unflushed data rows;
enabling incremental index maintenance for facilitating the creation of index rows for data that changes while the creation of index rows is in progress; and
marking the created index rows as active to enable queries to use the created index rows.

7. A non-transitory computer-readable medium having stored thereon instructions which, when executed by a computing device associated with a combined data repository having a relational data store and a non-relational data store, causes the computing device to perform operations comprising:
defining the search index metadata using a cache custom index object;
sending the search index metadata to the non-relational data store using one or more requests as part of an object;
retrieving a replaced row from the non-relational data store;
modifying the search index by at least one of (a) sending an updated search index row with its row values to the non-relational data store, and (b) replacing or shadowing a correspondingly existing search index row with the updated search index row;
calculating index statistics through normal queries of the non-relational data store;
storing the calculated index statistics in existing statistics tables; and
resending the search index metadata by modifying a sequence number for a corresponding combination of the statistic tables and organizations upon creation or deletion of an index, wherein the statistics tables are periodically updated using a scheduled batch process.

8. The computer-readable medium of claim 7, wherein modifying is performed simultaneously with updating of the non-relational data store, and wherein the search index metadata is maintained at a server computing device through a cache object that is responsible for maintaining a snapshot of unflushed rows for index data tables to ensure one or more operations are performed based on up-to-date data.

9. The computer-readable medium of claim 7, wherein the operations further comprise:
running an optimized routing in a new index creation mode for existing data segments;
writing out new data segments during index creation of the optimized routing;
creating index rows for one or more unflushed data rows;
enabling incremental index maintenance for facilitating the creation of index rows for data that changes while the creation of index rows is in progress; and
marking the created index rows as active to enable queries to use the created index rows.

10. In a combined non-transitory data repository having a relational data store and a non-relational data store, a method comprising:
retrieving a complete search index row from the non-relational data store, the search index row having a plurality of columns having row values containing metadata about the search index row;
updating the metadata and at least a portion of the row values of the plurality of columns to form an updated search index row having the plurality of columns, wherein a subset of the plurality of columns corresponding to the portion of the row values is updated;
sending the updated search index row with its row values to the non-relational data store, wherein the updated search index row replaces the search index row;
modifying a search index associated with the updated search index row by at least one of (a) sending the updated search index row with its row values to the non-relational data store, and (b) replacing or shadowing a correspondingly existing search index row with the updated search index row;
defining search index metadata using a cached custom index object;
sending the search index metadata to the non-relational data store using one or more requests as part of a specified object;
resending the search index metadata by modifying a sequence number for a corresponding combination of the statistic tables and organizations upon creation or deletion of an index;
calculating index statistics through normal queries of the non-relational data store;
storing the calculated index statistics in existing statistics tables; and
periodically updating the calculated index statistics of the statistics tables using a scheduled batch process.

11. The method of claim 10, wherein modifying is performed simultaneously with updating of the non-relational data store, and wherein the search index metadata is maintained at a server computing device through a cache object that is responsible for maintaining a snapshot of unflushed rows for index data tables to ensure one or more operations are performed based on up-to-date data.

12. The method of claim 10, further comprising:
running an optimized routing in a new index creation mode for existing data segments;
writing out new data segments during index creation of the optimized routing;
creating index rows for one or more unflushed data rows;
enabling incremental index maintenance for facilitating the creation of index rows for data that changes while the creation of index rows is in progress; and
marking the created index rows as active to enable queries to use the created index rows.

13. A non-transitory computer-readable medium having stored thereon instructions which, when executed by a computing device associated with a combined data repository having a relational data store and a non-relational data store, causes the computing device to perform operations comprising:
retrieving a complete search index row from the non-relational data store, the search index row having a plurality of columns having row values containing metadata about the search index row;

updating the metadata and at least a portion of the row values of the plurality of columns to form an updated search index row having the plurality of columns, wherein a subset of the plurality of columns corresponding to the portion of the row values is updated;

sending the updated search index row with its row values to the non-relational data store, wherein the updated search index row replaces the search index row;

modifying a search index associated with the updated search index row by at least one of (a) sending the updated search index row with its row values to the non-relational data store, and (b) replacing or shadowing a correspondingly existing search index row with the updated search index row;

defining search index metadata using a cached custom index object;

sending the search index metadata to the non-relational data store using one or more requests as part of a specified object;

resending the search index metadata by modifying a sequence number for a corresponding combination of the statistic tables and organizations upon creation or deletion of an index;

calculating index statistics through normal queries of the non-relational data store;

storing the calculated index statistics in existing statistics tables; and periodically updating the calculated index statistics of the statistics tables using a scheduled batch process.

14. The computer-readable medium of claim 13, wherein modifying is performed simultaneously with updating of the non-relational data store, and wherein the search index metadata is maintained at a server computing device through a cache object that is responsible for maintaining a snapshot of unflushed rows for index data tables to ensure one or more operations are performed based on up-to-date data.

15. The computer-readable medium of claim 13, wherein the operations further comprise:

running an optimized routing in a new index creation mode for existing data segments;

writing out new data segments during index creation of the optimized routing;

creating index rows for one or more unflushed data rows;

enabling incremental index maintenance for facilitating the creation of index rows for data that changes while the creation of index rows is in progress; and marking the created index rows as active to enable queries to use the created index rows.

16. A database system comprising a combined non-transitory data repository comprising a data processing device coupled to a relational data store and a non-relational data store, the data processing device of the combined non-transitory data repository to perform operations comprising:

defining, based on a cache custom index object, a search index associated with column values and metadata;

sending the search index to the non-relational data store using one or more requests as part of an object;

retrieving a replaced row from the non-relational data store;

modifying the search index by at least one of (a) sending an updated search index row with its row values to the non-relational data store, and (b) replacing or shadowing a correspondingly existing search index row with the updated search index row;

calculating index statistics through normal queries of the non-relational data store;

storing the calculated index statistics in existing statistics tables; and resending the search index to the non-relational data store by incrementing a sequence number up for a corresponding combination of the statistics tables and organizations upon creation or deletion of an index, wherein the statistics tables are periodically updated using a scheduled batch process.

17. The database system of claim 16, wherein modifying is performed simultaneously with updating of the non-relational data store, and wherein the search index metadata is maintained at a server computing device through a cache object that is responsible for maintaining a snapshot of unflushed rows for index data tables to ensure one or more operations are performed based on up-to-date data.

18. The database system of claim 16, wherein the operations further comprise:

running an optimized routing in a new index creation mode for existing data segments;

writing out new data segments during index creation of the optimized routing;

creating index rows for one or more unflushed data rows;

enabling incremental index maintenance for facilitating the creation of index rows for data that changes while the creation of index rows is in progress; and marking the created index rows as active to enable queries to use the created index rows.

19. A non-transitory computer-readable medium having stored thereon instructions which, when executed by a computing device associated with a combined data repository having a relational data store and a non-relational data store, causes the computing device to perform operations comprising:

defining, based on a cache custom index object, a search index associated with column values and metadata;

sending the search index to the non-relational data store using one or more requests as part of an object;

retrieving a replaced row from the non-relational data store;

modifying the search index by at least one of (a) sending an updated search index row with its row values to the non-relational data store, and (b) replacing or shadowing a correspondingly existing search index row with the updated search index row;

calculating index statistics through normal queries of the non-relational data store;

storing the calculated index statistics in existing statistics tables; and resending the search index to the non-relational data store by incrementing a sequence number up for a corresponding combination of the statistics tables and organizations upon creation or deletion of an index, wherein the statistics tables are periodically updated using a scheduled batch process.

20. The computer-readable medium of claim 19, wherein modifying is performed simultaneously with updating of the non-relational data store, and wherein the search index metadata is maintained at a server computing device through a cache object that is responsible for maintaining a snapshot of unflushed rows for index data tables to ensure one or more operations are performed based on up-to-date data.

21. The computer-readable medium of claim 19, wherein the operations further comprise:

running an optimized routing in a new index creation mode for existing data segments;

writing out new data segments during index creation of the optimized routing;

creating index rows for one or more unflushed data rows;
enabling incremental index maintenance for facilitating the creation of index rows for data that changes while the creation of index rows is in progress; and
marking the created index rows as active to enable queries to use the created index rows.

\* \* \* \* \*